US012626634B2

(12) United States Patent
Park et al.

(10) Patent No.: US 12,626,634 B2
(45) Date of Patent: May 12, 2026

(54) DISPLAY DRIVING DEVICE, PROCESSOR, AND ELECTRONIC SYSTEM

(71) Applicant: Samsung Electronics Co., Ltd., Suwon-si (KR)

(72) Inventors: Jiyu Park, Suwon-si (KR); Kyounghwan Kwon, Suwon-si (KR); Yonjun Shin, Suwon-si (KR); Junghak Lee, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 18/817,699

(22) Filed: Aug. 28, 2024

(65) Prior Publication Data

US 2025/0273116 A1 Aug. 28, 2025

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2310/08* (2013.01); *G09G 2340/0407* (2013.01); *G09G 2360/10* (2013.01)

(58) Field of Classification Search
CPC ......... G09G 3/2092; G09G 2310/0275; G09G 2310/08; G09G 2340/0407; G09G 2360/10
See application file for complete search history.

(56) References Cited

U.S. PATENT DOCUMENTS 7,408,589 B2 8/2008 Ebara et al.
9,001,160 B2 4/2015 Prabakaran
9,734,791 B2 8/2017 Obinata et al.
10,818,270 B2 10/2020 Bae et al.
11,017,496 B2 5/2021 Bae et al.
(Continued)

FOREIGN PATENT DOCUMENTS

EP 3843079 A1 6/2021
EP 4503010 A1 2/2025
(Continued)

OTHER PUBLICATIONS

Extended European Search Report in European Appln. No. EP 24212138.2, mailed on Apr. 7, 2025, 14 pages.

*Primary Examiner* — Sujit Shah
(74) *Attorney, Agent, or Firm* — Fish & Richardson P.C.

(57) ABSTRACT

An electronic system may include a processor configured to output image data corresponding to an original image having a first resolution and a synchronization signal; and a display driving device configured to generate a result image having a higher than the first resolution, based on the image data and the synchronization signal, the image data including line image data corresponding to horizontal lines of the original image, and the synchronization signal including horizontal synchronization signals output at horizontal periods, the horizontal synchronization signals including active synchronization signals determining output timing of the line image data, and blank synchronization signals unrelated to the line image data, and the processor configured to output at least one of the blank synchronization signals between at least some of the active synchronization signals, based on scaling information determined based on the first resolution and the second resolution.

19 Claims, 22 Drawing Sheets

(56) References Cited

U.S. PATENT DOCUMENTS

| | | | |
|---|---|---|---|
| 11,238,771 B2 | 2/2022 | Bae et al. | |
| 11,538,438 B2 | 12/2022 | Bae et al. | |
| 11,645,961 B2 | 5/2023 | Lee et al. | |
| 2018/0137602 A1* | 5/2018 | Spitzer | G06T 11/001 |
| 2020/0357357 A1* | 11/2020 | Yamagishi | G09G 5/391 |
| 2022/0036853 A1* | 2/2022 | Bae | G09G 5/12 |
| 2022/0319372 A1* | 10/2022 | Lee | G09G 5/006 |
| 2023/0222957 A1 | 7/2023 | Kim et al. | |

FOREIGN PATENT DOCUMENTS

| | | | |
|---|---|---|---|
| KR | 10-2002-0013650 | A | 2/2002 |
| KR | 10-2008-0078700 | A | 8/2008 |
| KR | 10-2010-0059024 | A | 6/2010 |
| WO | 2007/120303 | A2 | 10/2007 |
| WO | WO 2023/210991 | A1 | 11/2023 |

* cited by examiner

DISPLAY DRIVING DEVICE, PROCESSOR, AND ELECTRONIC SYSTEM

CROSS-REFERENCE TO RELATED APPLICATION(S)

This application claims benefit of priority to Korean Patent Application No. 10-2024-0029008 filed on Feb. 28, 2024, in the Korean Intellectual Property Office, the disclosure of which is incorporated herein by reference in its entirety.

BACKGROUND

The present disclosure relate to display driving devices, processors, and electronic systems.

By utilizing technology to upscale a relatively low-resolution original image and output a result image having high resolution to a display, internal storage capacitance of an electronic device may be reduced and a high-quality result image may be provided to a user. A processor generates a result image after completing an upscaling process, and a display driving device receives the result image and outputs the result image to a display panel, from which an upscaling function may be implemented. However, in this method, the amount of data transmitted and power consumption between the processor and the display driving device may increase. The upscaling function may be implemented in the display driving device to reduce an increase in the amount of data transmitted and the power consumption, but in this case, the display driving device must include an internal memory such as a buffer that may store an original image, which may lead to a decrease in the integration of the display driving device and an increase in manufacturing costs.

SUMMARY

Some aspects of the present disclosure are to provide display driving devices, processors, and electronic systems which may implement an upscaling function without a memory for storing an original image while minimizing an increase in the amount of data transmitted between a processor and a display driving device.

According to some example embodiments of the present disclosure, an electronic system includes a processor configured to output a synchronization signal, and image data corresponding to an original image having a first resolution; and a display driving device configured to generate a result image having a second resolution, higher than the first resolution, based on the image data and the synchronization signal, the image data including a plurality of line image data corresponding to horizontal lines of the original image and the synchronization signal including a plurality of horizontal synchronization signals output at horizontal periods, the plurality of horizontal synchronization signals include a plurality of active synchronization signals determining output timing of the plurality of line image data, and a plurality of blank synchronization signals unrelated to the plurality of line image data, and the processor configured to output at least one of the blank synchronization signals between at least some of the active synchronization signals, based on scaling information determined based on the first resolution and the second resolution.

According to some example embodiments of the present disclosure, a display driving device includes a receiver configured to receive display data including image data and a synchronization signal from an external host; and an image scaler configured to upscale resolution of the image data based on a plurality of horizontal synchronization signals included in the synchronization signal and transmitted at horizontal periods, the plurality of horizontal synchronization signals including a plurality of active synchronization signals transmitted in synchronization with a plurality of line image data corresponding to a plurality of horizontal lines included in the image data, and a plurality of blank synchronization signals unrelated to the plurality of line image data, and the image scaler is configured to generate a plurality of additional line image data synchronized to the plurality of blank synchronization signals, based on at least one line image data transmitted in synchronization with at least one of the plurality of active synchronization signals.

According to some example embodiments of the present disclosure, a processor includes storage configured to store scaling information received externally; a video timer configured to generate a vertical synchronization signal and a horizontal synchronization signal based on the scaling information; a packet generator configured to generate a plurality of data packets inside one period of the vertical synchronization signal; and an image processing logic configured to output an original image including a plurality of line image data arranged along a plurality of horizontal lines to the packet generator, the packet generator configured to generate a portion of the plurality of data packets based on matching active synchronization signals included in the horizontal synchronization signal with the plurality of line image data, respectively, and generate a remainder of the plurality of data packets using blank synchronization signals included in the horizontal synchronization signal.

According to some example embodiments of the present disclosure, a processor may transmit image data of an original image and a synchronization signal to a display driving device by referring to scaling information of an image scaler included in the display driving device and configured to perform upscaling. The synchronization signal may include active synchronization signals matching line image data corresponding to horizontal lines of the original image and blank synchronization signals unrelated to the line image data, and the display driving device may synchronize image data generated by the upscaling with the timing of synchronization signals and may output the image data to a display panel. Accordingly, the upscaling function may be implemented in the display driving device without a separate internal memory while minimizing (or reducing) an increase in the amount of data transmitted between the processor and the display driving device.

Advantages and effects of the present application are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described with reference to the accompanying drawings.

Figure 1A:
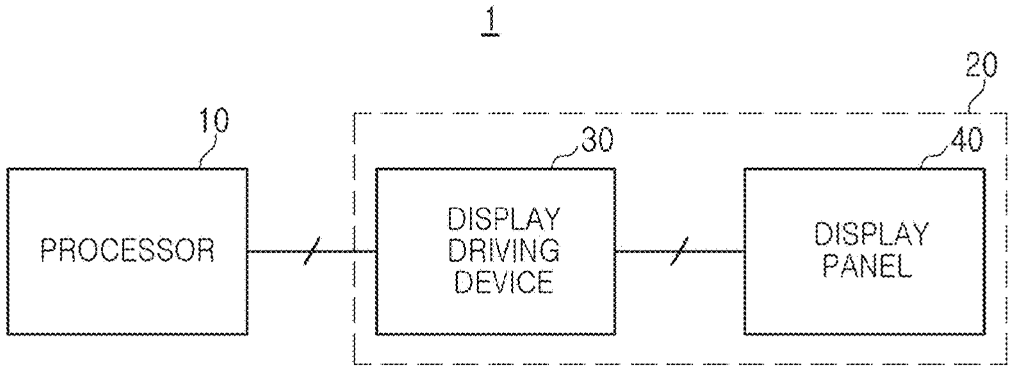
FIGS. 1A and 1B are schematic diagrams of an electronic device according to some example embodiments of the present disclosure.
Figure 1B:
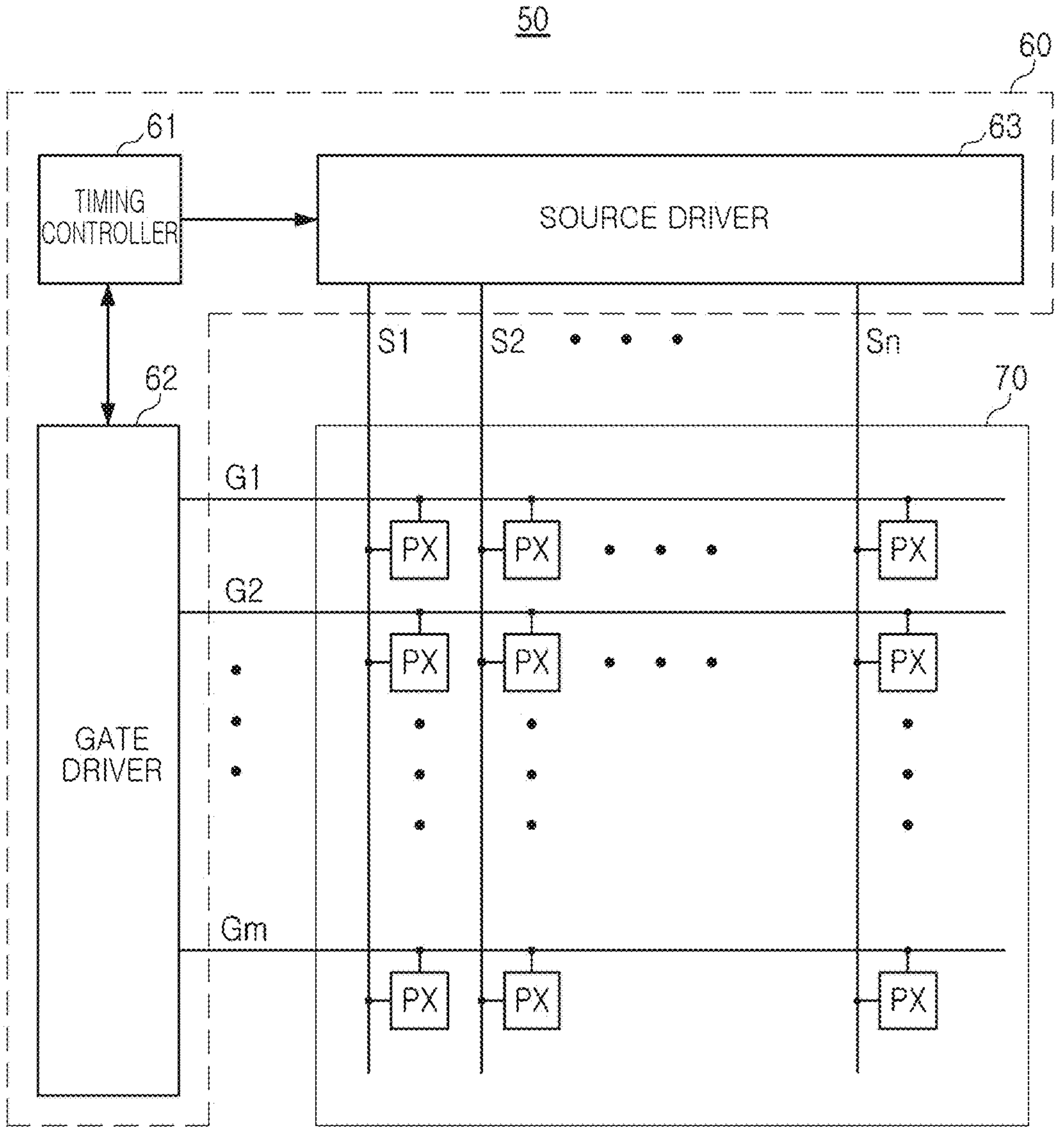

FIGS. 1A and 1B are schematic diagrams of an electronic device according to some example embodiments of the present disclosure.

First, referring to FIG. 1A, an electronic device 1 according to some example embodiments of the present disclosure may include a processor 10 and a display device 20, and the display device 20 may include a display driving device 30 and a display panel 40.

The processor 10 may be an application processor (AP) for a mobile device, and may be the Central Processing Unit (CPU) for a desktop or a laptop computer. The processor 10 may be interpreted to denote a processing device or a host having a computational function. The processor 10 may generate an original image to be displayed through the display device 20, or may receive the original image from a memory, a communication module, or the like, and transmit the original image to the display driving device 30.

The display device 20 may include a display driving device 30 and a display panel 40. The display driving device 30 may include a gate driver for inputting image data transmitted by the processor 10 to the display panel 40, and a source driver, and may include a timing controller configured to control the gate driver and the source driver. The timing controller may control the gate driver and the source driver according to a vertical synchronization signal and a horizontal synchronization signal.

The display driving device 30 may communicate with the processor 10 based on a communication interface. In some example embodiments, the display driving device 30 may communicate with the processor 10 based on a high-speed serial interface such as a Mobile Industry Processor Interface (MIPI). When the processor 10 and the display driving device 30 communicate according to the MIPI, the display driving device 30 may operate in one of a command mode of receiving only image data from the processor 10, and a video mode of receiving image data and a synchronization signal from the processor 10.

Next, referring to FIG. 1B, a display device 50 may include a display driving device 60 and a display panel 70. The display driving device 60 may include a timing controller 61, a gate driver 62, and a source driver 63. The display panel 70 may include a plurality of pixels PX arranged along a plurality of gate lines G1 to Gm and a plurality of source lines S1 to Sn.

In some example embodiments, the display device 50 may display an image in units of frames. The time required to display one frame may be defined as a vertical period, and the vertical period may be determined by a scan rate of the display device 50. As an example, when a scanning rate of the display device 50 is 60 Hz, the vertical period may be 1/60 second, or approximately 16.7 msec, and when the scanning rate is 144 Hz, the vertical period may be 1/144 second, or approximately 6.94 msec.

During one vertical period, the gate driver 62 may scan a plurality of gate lines G1 to Gm one by one. The time for the gate driver 62 to scan the plurality of gate lines G1 to Gm one by one may be defined as a horizontal period, and during one horizontal period, the source driver 63 may output a data signal. For example, the source driver 63 may output a source voltage as a data signal to source lines S1 to Sn. Accordingly, the source voltage may be input to the pixels PX connected to one gate line scanned by the gate driver 62 during one horizontal period.

In some example embodiments, the horizontal period and the vertical period may be determined by the timing controller 61. When the display driving device 60 is connected to an external host such as a processor through a MIPI interface, in the command mode, the timing controller 61 may directly determine the horizontal period and the vertical period. On the other hand, in the video mode, the horizontal period and the vertical period of the display device 50 may be determined by the synchronization signal generated by the processor and transmitted through the MIPI interface.

An upscaling function output by the display device 50 by improving resolution of an original image generated directly by the processor or received from other external devices, such as an image sensor, a memory, or a communication modem may be implemented differently in the command mode and the video mode. For example, in the command mode, the processor may transmit the original image to the display driving device 60 (for example, without changing or altering the original image), and the display driving device 60 may store the original image in the internal memory such as a buffer, and may then output a result image obtained by improving resolution to the display panel 70.

Output timing of the result image adjusted to have high resolution may be determined by the horizontal period and the vertical period generated by the timing processor 61. However, in this manner, the internal memory must be included in the display driving device 60, so that a size of the display driving device 60 may increase and the degree of integration may decrease.

As described above, in the video mode, the display driving device 60 may drive the display panel 70 based on the synchronization signal transmitted by the processor. Accordingly, in the video mode, the processor may upscale the original image to produce the result image, and may transmit the result image along with the synchronization signal to output a high-resolution result image to the display panel 70. However, in this manner, the amount of data transmitted between the processor and the display driving device 60 inevitably increases, which may result in increased power consumption.

In some example embodiments of the present disclosure, the display driving device 60 may execute the upscaling function without the internal memory and may output the high-resolution result image to the display panel 70. The processor may transmit image data corresponding to the original image along with the synchronization signal to the display driving device 60, but the processor may also transmit blank synchronization signals in addition to active synchronization signals required to display the original image to the display driving device 60.

The active synchronization signals may be matched with line image data corresponding to the horizontal lines of the original image and transmitted to the display driving device 60, and the blank synchronization signals may be transmitted to the display driving device 60 regardless of the image data. An image scaler of the display driving device 60 may add and output pixel data in a horizontal line direction, with respect to the line image data received along with the active synchronization signal.

Additionally, the image scaler may generate additional line image data by referring to two or more previously received line image data in response to the blank synchronization signal. The display driving device 60 may output additional line image data generated by the image scaler to the source lines S1 to Sn at the timing specified by the blank synchronization signal. Accordingly, without the internal memory of the display driving device 60, the upscaling function may be implemented while minimizing (or reducing) the increase in the amount of data transmitted between the processor and the display driving device 60.

Figure 2:
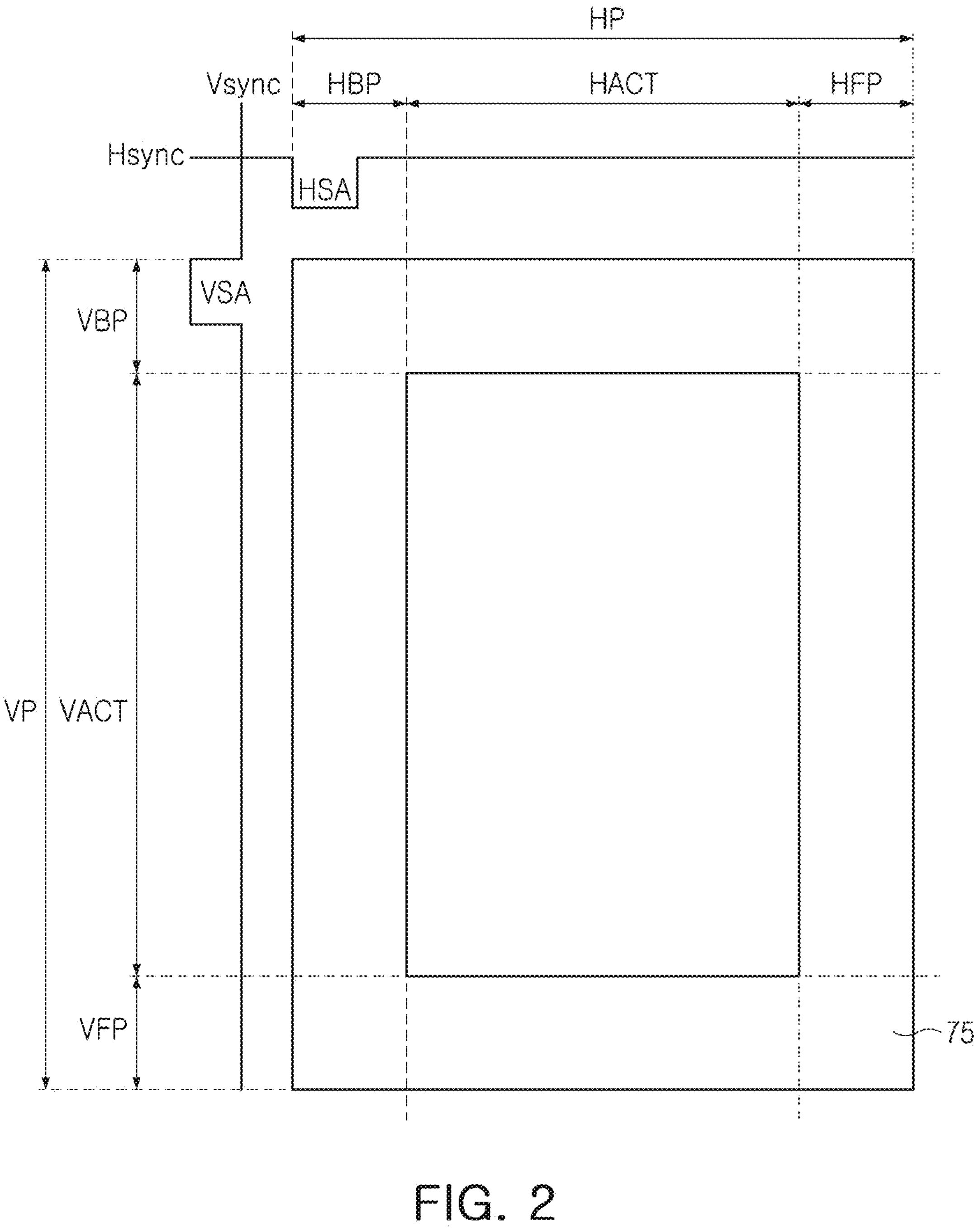
FIG. 2 is a view illustrating an operation of a display driving device according to some example embodiments of the present disclosure.

FIG. 2 is a view illustrating an operation of a display driving device according to some example embodiments of the present disclosure.

Referring to FIG. 2, the display panel 75 may operate by a vertical synchronization signal Vsync having a vertical period VP and a horizontal synchronization signal Hsync having a horizontal period HP. The vertical period VP may include a first vertical porch section VBP, a vertical active section VACT, and a second vertical porch section VFP, and the first vertical porch section VBP may include a vertical response section (VSA, Vertical Sync Area). In some example embodiments, the first vertical porch section VBP may be a vertical back porch section, and the second vertical porch section VFP may be a vertical front porch section.

The horizontal period HP may include a first horizontal porch section HBP, a horizontal active section HACT, and a second horizontal porch section HFP, and the first horizontal porch section HBP may include a horizontal response section (HSA, Horizontal Sync Area). In some example embodiments, the first horizontal porch section HBP may be a horizontal back porch section, and the second horizontal porch section HFP may be a horizontal front porch section.

Scanning a plurality of gate lines included in the display panel 75 and inputting data to pixels connected to the scanned gate lines may be implemented during vertical and horizontal active sections VACT and HACT. That is, the gate lines may be scanned sequentially during the vertical active section VACT, and data input for pixels connected to the scanned gate line may be performed during the horizontal active section HACT.

The display driving device may drive the display panel 75 using a vertical synchronization signal Vsync and a horizontal synchronization signal Hsync received from an external host, such as a processor. In some example embodiments of the present disclosure, when the upscaling function is activated, the horizontal synchronization signal (Hsync) received by the display driving device may include active synchronization signals and blank synchronization signals. The active synchronization signals may be signals transmitted by matching line image data corresponding to the horizontal lines of the original image, and the blank synchronization signals may be signals transmitted regardless of the line image data.

A data signal output to the display panel 75 at the timing specified by each of the blank synchronization signals may be generated by the image scaler included in the display driving device. The image scaler may generate additional line image data to be output to the display panel 75 at the timing specified by the blank synchronization signal using line image data matched to active synchronization signals received before the blank synchronization signal.

Figure 3A:
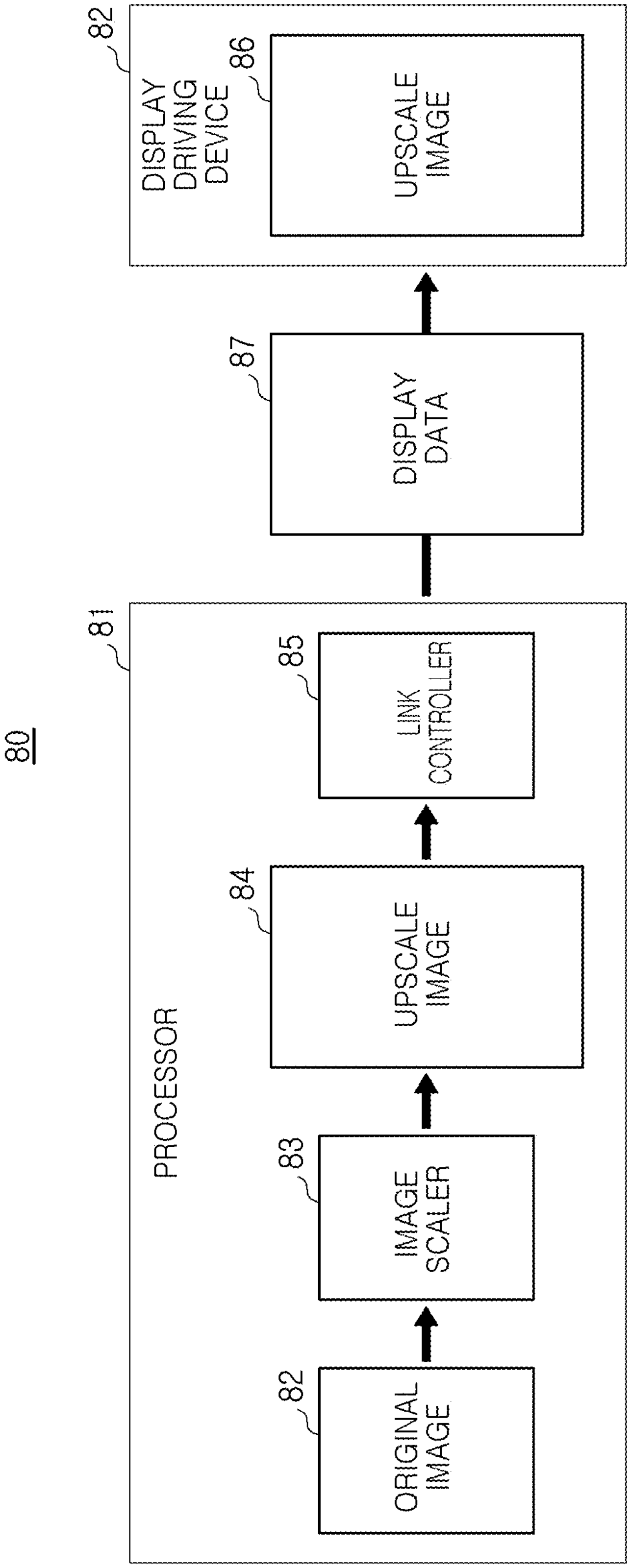
FIGS. 3A and 3B are views illustrating an operation of an electronic device according to some example embodiments of the present disclosure.
Figure 3B:
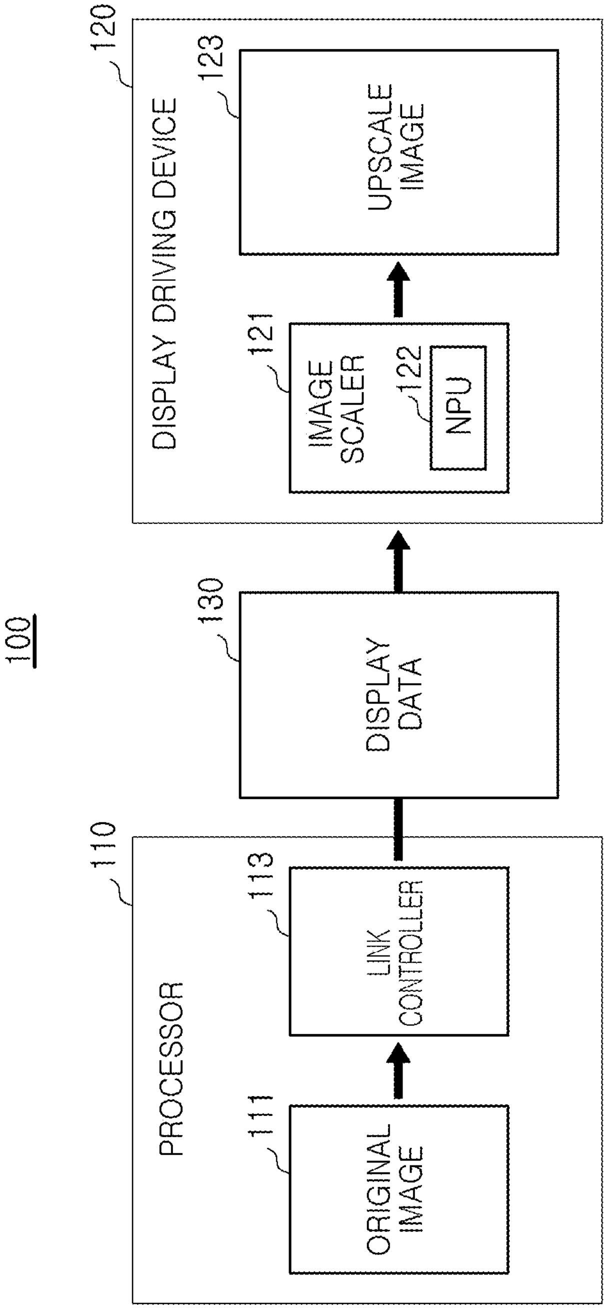

FIGS. 3A and 3B are views illustrating an operation of an electronic device according to some example embodiments of the present disclosure.

First, referring to FIG. 3A, an electronic device 80 supporting an upscaling function may include a processor 81 and a display driving device 82. The display driving device 82 may display a result image on a display panel.

The processor 81 may include an image scaler 83 configured to adjust the resolution of an original image 82, and the image scaler 83 may generate an upscale image 84 by increasing the resolution of the original image 82. The processor 85 may include a link controller 85 connected to the display driving device 82 by a predetermined (or, alternatively, desired or selected) interface, such as an MIPI interface, and the link controller 85 may transmit display data 87 including the upscale image 84 to the display driving device 82. The display driving device 82 may display the upscale image 86 on the display panel, and thus, a result image having resolution higher than that of the original image 82 may be output to the display panel.

Next, referring to FIG. 3B, in an electronic device 100 according to some example embodiments of the present disclosure may support the upscaling function in a different manner than that described with reference to FIG. 3A. The electronic device 100 according to some example embodiments illustrated in FIG. 3B may include a processor 110 and a display driving device 120, and the processor 110 may transmit display data 130 to the display driving device 120.

The processor 110 may obtain the original image 111 from an image sensor, a communication modem, a memory, and the like. A link controller 113 may generate the display data 130 including image data corresponding to the original image 111 and may transmits the display data 130 to the display driving device 120, and for example, the display data 130 may further include a synchronization signal in addition to the image data. The synchronization signal may include a vertical synchronization signal and a horizontal synchronization signal required for the display driving device 120 to control the display panel.

The resolution of the original image 111 may be adjusted in the image scaler 121 included in the display driving device 120. The image scaler 121 may increase the resolution of the original image 111 using a predetermined (or, alternatively, desired or selected) upscaling algorithm, or may increase the resolution of the original image 111 using a neural processor 122 trained to support an upscaling function. An upscale image 123 output by the image scaler 121 may be output as a result image on the display panel.

In some example embodiments illustrated in FIG. 3B, the synchronization signal transmitted by the link controller 113 together with the image data of the original image 111 may be generated by matching the resolution of the upscale image 123, rather than the resolution of the original image

111. As an example, the link controller 113 may generate the vertical synchronization signal in consideration of the time required to display one image frame included in the upscale image 123 on the display panel. Additionally, the link controller may determine the number of horizontal synchronization signals and the timing of each of the horizontal synchronization signals in consideration of the resolution of the upscale image 123.

In some example embodiments, the number of horizontal synchronization signals transmitted by the link controller 113 to the display data 130 may be more than the number of horizontal lines included in the original image 111. The link controller 113 may generate active synchronization signals matched to the horizontal lines included in the original image 111 and blank synchronization signals not matched to the horizontal lines included in the original image 111, and may allow the active synchronization signals and the blank synchronization signals to be included in display data 130.

The number of blank synchronization signals and the transmission order of blank synchronization signals may vary, depending on scaling information received from the image scaler 121. For example, the image scaler 121 may increase the resolution of the original image 111 so that an algorithm used to generate the upscale image 123, a resolution difference between the original image 111 and the upscale image 123, and the like, may be included in scaling information, and the scaling information may be transmitted to the processor 110. The link controller of the processor 110 may determine the number and transmission order of blank synchronization signals by referring to the scaling information, and may set the porch section and the active section in the horizontal period according to each of the active synchronization signals and blank synchronization signals.

Since, in addition to the active horizontal synchronization signals, blank horizontal synchronization signals are included in the display data 130 and transmitted to the display driving device 120, the time required to transmit the display data 130 may not be significantly different from the time required to transmit the display data 87 in the example embodiment previously described with reference to FIG. 3A. However, in some example embodiments illustrated in FIG. 3B, since image data of the original image 111 having a relatively low resolution is included in the display data 130, the amount of data transmitted may be lowered as compared to the example embodiment illustrated in FIG. 3A. For example, the image data of the original image 111 may be transmitted by matching the active horizontal synchronization signals, and there may be no matching image data for each of the blank horizontal synchronization signals. Accordingly, the efficiency of the amount of data transmitted and power consumption may be improved.

The display driving device 120 may receive display data 130 in units of horizontal lines, and the image scaler 121 may generate the upscale image 123 by upscaling the original image 111 in units of horizontal lines. Accordingly, without a separate internal memory included in the display driving device 120 or with only a low-capacitance buffer capable of storing image data corresponding to some horizontal lines included in the original image 111, the display driving device 120 may support the upscaling function in a video mode in which the operation timing of the display driving device 120 is determined by the processor 110. Accordingly, the integration of the display driving device 120 may be improved and a size thereof may be reduced simultaneously with improving the efficiency of the amount of data transmitted and power consumption.

Figure 4:
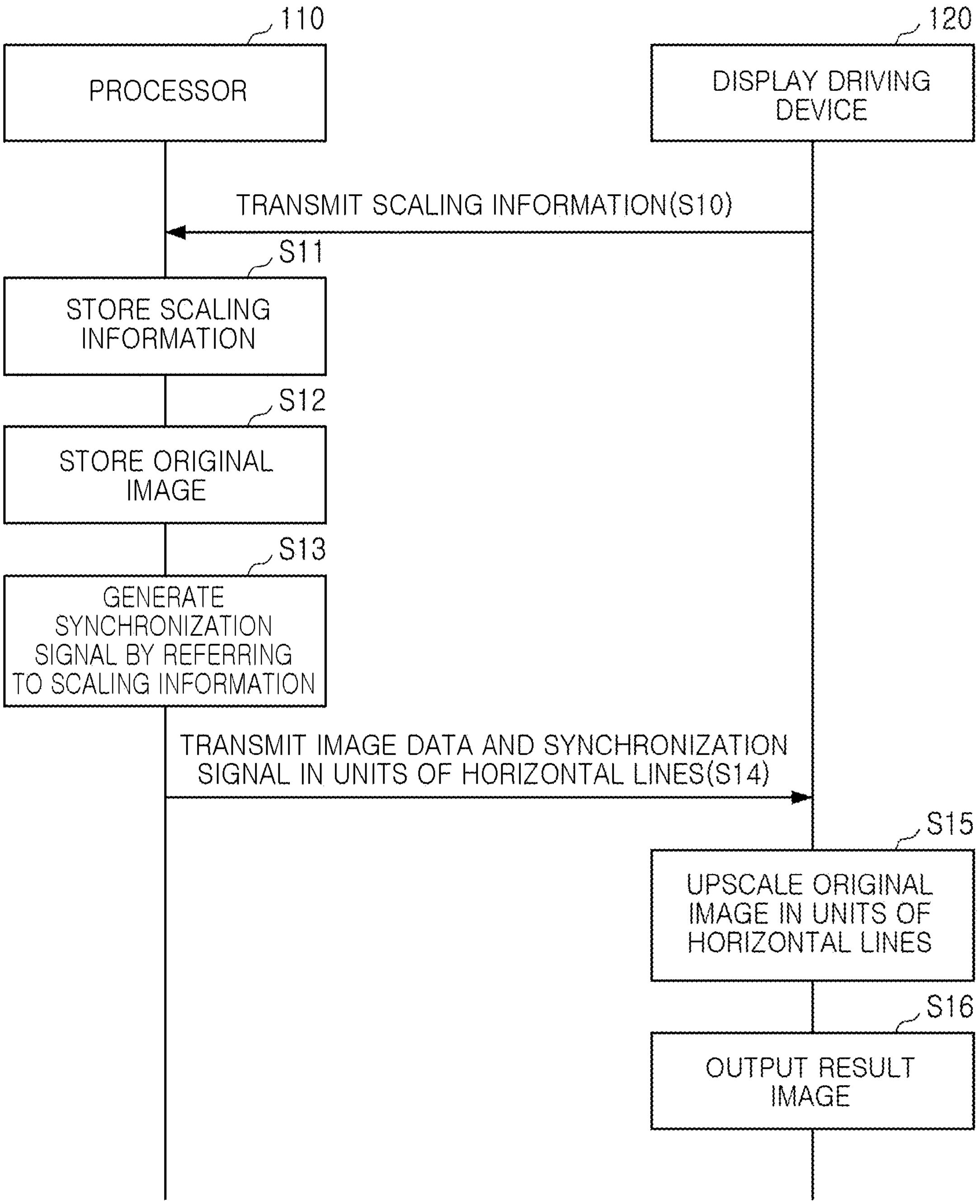
FIG. 4 is a view illustrating an operation of an electronic device according to some example embodiments of the present disclosure.

FIG. 4 is a view illustrating an operation of an electronic device according to some example embodiments of the present disclosure.

Referring to FIG. 4, an electronic device according to some example embodiments of the present disclosure may include a processor 110 and a display driving device 120, and an operation of the electronic device may begin with the display driving device 120 transmitting scaling information to the processor 110. The scaling information may be information generated by an image scaler included in the display driving device 120.

For example, the image scaler may generate the scaling information based on a difference between a first resolution of the original image acquired or generated by the processor 110 and a second resolution of the result image generated by upscaling the original image by the image scaler. In some example embodiments, the scaling information may include the second resolution of the result image generated by the image scaler, additional image data required by the image scaler to generate the result image at the second resolution, and a size of data required for the image scaler to generate the additional image data among the image data of the original image.

The processor 110 may store the scaling information (S11) and the original image (S12). For example, the processor 110 may receive and store the original image from the image sensor and the communication modem included in the electronic device, or may read and store the original image stored in the memory. The processor 110 may generate the synchronization signal to be transmitted to the display driving device 120 along with the image data of the original image by referring to the scaling information (S13)

The synchronization signal may include a vertical synchronization signal and a horizontal synchronization signal, and a plurality of horizontal synchronization signals may be output while the processor 110 outputs one cycle of the vertical synchronization signal. The one cycle of the vertical synchronization signal may be determined by a scanning rate at which one image frame is displayed on the display panel. Meanwhile, one cycle of the horizontal synchronization signal may be determined by the time required to input a data signal to a plurality of pixels arranged along one gate line.

In some example embodiments illustrated in FIG. 4, the processor 110 may transmit display data including image data and a synchronization signal in units of horizontal lines (S14). The processor 110 may transmit the synchronization signal at a timing that matches the second resolution of the result image to be generated by performing the upscaling function using the image scaler of the display driving device 120, so that the display driving device 120 may drive a display panel in synchronization with the synchronization signal received from the processor 110.

For example, the result image may include a greater number of horizontal lines than the original image. The processor 110 may generate blank synchronization signals equal to the number of horizontal lines to be added to the result image. In accordance with the order of horizontal lines added to the original image in a process in which the image scaler performs the upscaling function, the processor 110 may transmit blank synchronization signals to the display driving device 120. Line image data matching horizontal lines included in the original image may be transmitted to the display driving device 120 along with active synchronization signals.

Meanwhile, when comparing the result image and the original image in units of horizontal lines, the result image may include more image pixels arranged along a single horizontal line as compared to the original image. The processor 110 may increase and set the front porch section after the active section in each of the active synchronization signals and the blank synchronization signals. The image scaler may change at least a portion of the front porch section of each of the active synchronization signals and the blank synchronization signals to the active section and may utilize the active section as a time to output image pixels that need to be added along the horizontal line.

The display driving device 120 may upscale the original image in units of horizontal lines using the synchronization signal and the image data received in units of horizontal lines (S15). For example, when receiving an active synchronization signal and line image data matching the corresponding active synchronization signal in the original image, the image scaler may add as many image pixels as necessary (or, alternatively, desired or selected) to increase resolution to line image data.

Additionally, for example, when the blank synchronization signal is received, the image scaler may generate new additional line image data by referring to previously received line image data. The display driving device 120 may output a data signal corresponding to additional line image data, to pixels connected to a gate line activated at the timing of the blank synchronization signal in the display panel.

The display driving device 120 may output the result image in units of horizontal lines (S16). As described above, the gate lines may be activated in order on the display panel according to the timing of the active synchronization signal or the blank synchronization signal, may output a data signal obtained by adding additional image pixels to the line image data received along with the active synchronization signal, or may output a data signal corresponding to newly generated additional line image data. As such, the result image may be displayed.

Figure 5:
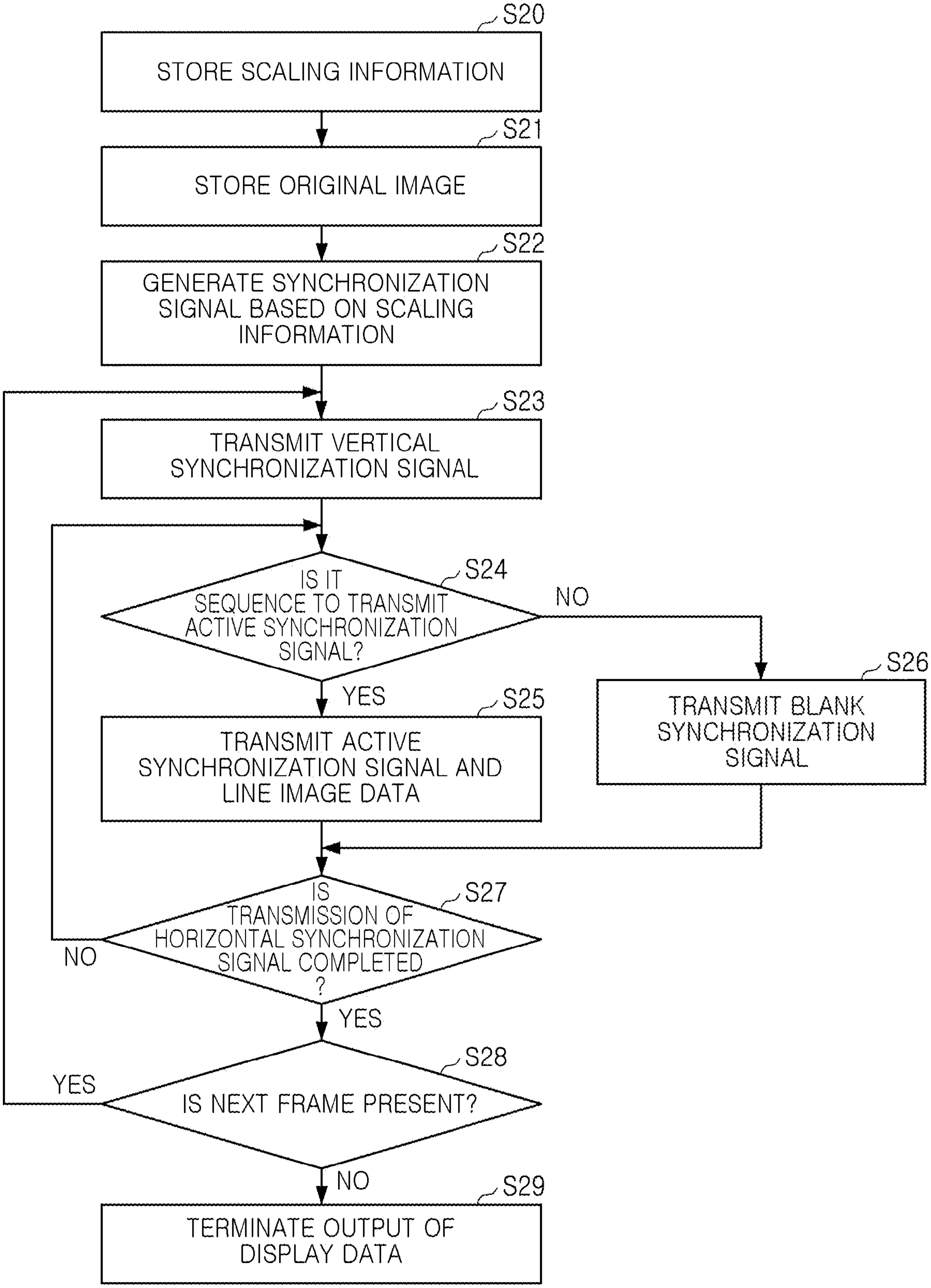
FIG. 5 is a view illustrating an operation of a processor according to some example embodiments of the present disclosure.

FIG. 5 is a view illustrating an operation of a processor according to some example embodiments of the present disclosure.

Referring to FIG. 5, an operation of the processor according to some example embodiments of the present disclosure may begin by storing scaling information (S20). As above described, the scaling information may be received from an image scaler included in the display driving device. The scaling information may include resolution of a result image generated by the image scaler, additional image data required by the image scaler to generate the result image, and a size of data required for the image scaler to generate additional image data among the image data of the original image.

According to some example embodiments, an operation of storing the scaling information may be executed in advance at the time of shipment of the electronic device including the processor and the display driving device. For example, the scaling information required for an upscaling operation of the image scaler included in the display driving device may be stored in advance by the processor in a setup process after minimal booting of the electronic device. Alternatively, the image scaler may update scaling information required for the upscaling operation at certain intervals and transmit the update scaling information to the processor.

Next, the processor may store an original image (S21). The processor may receive the original image from an image sensor, a communication modem, and an external device or may read and store the original image stored in memory. Once the original image is stored, the processor may generate a synchronization signal based on the scaling information (S22), and the synchronization signal may include a vertical synchronization signal and a horizontal synchronization signal.

The processor may transmit image data included in the original image and display data including the synchronization signal to the display driving device, and the display driving device may drive a display panel by referring to the synchronization signal received from the processor. As described above, in order to drive the display panel, a plurality of horizontal synchronization signals need to be output within one cycle of the vertical synchronization signal. Accordingly, first, the processor may transmit the vertical synchronization signal (S23).

In the case of transmitting horizontal synchronization signals in order, the processor may first determine whether the horizontal synchronization signal to be transmitted at the current timing is an active synchronization signal (S24). When the horizontal synchronization signal that is the transmission turn is an active synchronization signal, the processor may transmit line image data along with the active synchronization signal (S25). The line image data may be image data arranged along one of the horizontal lines included in the original image. On the other hand, when the horizontal synchronization signal that is the transmission turn is a blank synchronization signal, the processor may transmit only the blank synchronization signal (S26). In other words, the processor may only transmit the blank synchronization signal regardless of the image data included in the original image.

The processor may determine whether transmission of the horizontal synchronization signals has been completed (S27). When it is determined that the transmission of horizontal synchronization signals that must be transmitted while the vertical synchronization signal is transmitted once is not completed, an operation of determining whether the horizontal synchronization signal that is the transmission turn is an active synchronization signal and transmitting an active synchronization signal or a blank synchronization signal according to the determination result may be repeated (S24 to S26).

Meanwhile, when it is determined that the transmission of horizontal synchronization signals has been completed, the processor may determine whether a next frame is present (S28). When it is determined that the next frame is present in operation S28, the processor may again transmit the vertical synchronization signal (S23) and the horizontal synchronization signals (S24 to S26). Meanwhile, when it is determined in operation S28 that the next frame is not present, the processor may terminate output of display data (S29).

Figure 6:
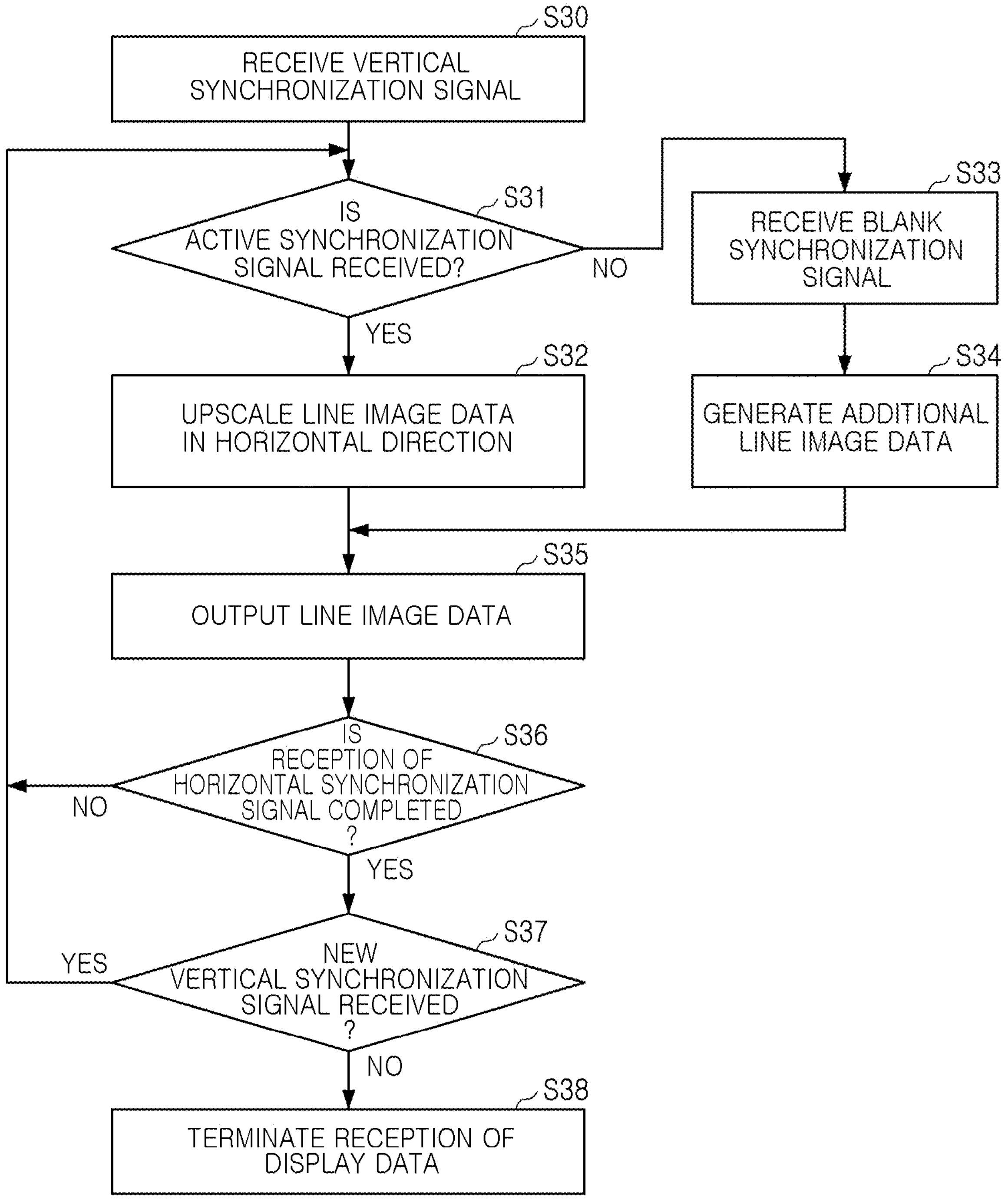
FIG. 6 is a diagram illustrating an operation of a display driving device according to some example embodiments of the present disclosure.

FIG. 6 is a diagram illustrating an operation of a display driving device according to some example embodiments of the present disclosure.

Referring to FIG. 6, an operation of the display driving device according to some example embodiments of the present disclosure may begin by receiving a vertical synchronization signal (S30). In some example embodiments described with reference to FIG. 6, the display driving device may operate in a video mode of driving a display panel based on a vertical synchronization signal and a horizontal synchronization signal included in display data received from the processor.

In one cycle of the vertical synchronization signal, the display driving device may receive a plurality of horizontal synchronization signals, and the plurality of horizontal synchronization signals may include active synchronization signals and blank synchronization signals. The active synchronization signals may be transmitted along with a plurality of line image data matching horizontal lines of an original image stored in the processor, and in the blank synchronization signals, only synchronization signals may be transmitted regardless of the plurality of line image data.

The display driving device may determine whether the received horizontal synchronization signal is an active synchronization signal (S31). When the active synchronization signal is determined to be received, the image scaler of the display driving device may horizontally upscale line image data transmitted along with the active synchronization signal (S32). For example, the image scaler may change a portion of a front porch section of the active synchronization signal to an active section, and may upscale the line image data in the horizontal direction by inserting pixel data at the time changed to the active section.

When it is determined in operation S31 that the active synchronization signal is not received, the display driving device may determine that the blank synchronization signal is received (S33), and may generate additional line image data corresponding to the blank synchronization signal (S34). When upscaling of the line image data or generation of the additional line image data is completed, the display driving may output the line image data (S35).

For example, when the active synchronization signal is received, the display driving device may select and drive one of the gate lines of the display panel at the timing specified by the active synchronization signal, and may input a data signal included in the upscaled line image data to the pixels connected to the selected gate line. Meanwhile, when receiving the blank synchronization signal, the display driving device may select and drive one of the gate lines of the display panel at the timing specified by the blank synchronization signal, and may input a data signal included in additional line image data to pixels connected to the selected gate line.

After performing the operation, the display driving device may determine whether reception of the horizontal synchronization signal is completed (S36). For example, the display driving device may compare the number of horizontal lines included in the result image upscaled by the image scaler and the number of horizontal synchronization signals received. When the number of horizontal synchronization signals received is less than the number of horizontal lines, the display driving device may determine that reception of the horizontal synchronization signal is not completed.

On the other hand, when the number of horizontal lines is equal to the number of receptions of horizontal synchronization signals, the display driving device may determine that all horizontal synchronization signals corresponding to one frame are received and determine whether a new vertical synchronization signal is received (S37). When the new vertical synchronization signal is received, the display driving device may determine that there is a next frame to be output and may repeat operations S31 to S36. If no new vertical synchronization signal is received, the display driving device may determine that the next frame is not present, the reception of display data from the display driving device may be terminated (S38).

FIGS. 7 to 10 are views illustrating an operation of an electronic device according to some example embodiments of the present disclosure.

Referring to FIGS. 7 to 10, an electronic device 200 according to some example embodiments of the present disclosure may include a processor 210 and a display driving device 220, and the processor 210 and the display driving device 220 may exchange data with each other through a predetermined (or, alternatively, desired or selected) interface. For example, the processor 210 and the display driving device 220 may exchange data with each other using an MIPI interface.

The processor 210 may include a core 211, a storage 212, a video timer 213, an image processing logic 214, a packet generator 215, a scaling information processing logic 216, and a system bus 217. Components 211 to 216 included in the processor 210 may exchange data with each other through the system bus 217. The processor 210 may further include various other components, such as a power management logic, a graphics processing logic, and a neural network processing logic, in addition to the components shown in FIGS. 7 to 10.

The display driving device 220 may include an image scaler 221. In addition to the image scaler 221, the display driving device 220 may further include a timing controller, a gate driver, and a source driver for driving a display panel. The image scaler 221 may receive image data included in the original image from the processor 210, and generate a result image by performing an upscaling operation for increasing the resolution of the image data.

The core 211 may execute various calculations required to control the electronic device 200. According to some example embodiments, the processor 210 may have a multicore architecture including two or more cores 211.

The storage 212 is a memory inside the processor 210 and may store scaling information from the system bus 217. The scaling information is information necessary (or, alternatively, desired or selected) for the image scaler 221 to upscale the resolution of the original image, and the processor 210 may receive the scaling information from the display driving device 220 and store the scaling information in the storage 212. The scaling information may include the number and position of image pixels added to the original image in the upscaling operation of the image scaler 221, and information such as the resolution of the result image generated by the upscaling operation. Accordingly, the scaling information stored in the storage 212 may vary, depending on an algorithm that the image scaler 221 uses for the upscaling operation.

The scaling information may be received by a scaling information processing logic 216. For example, in the MIPI interface, a data lane may support two-way data transmission, and the scaling information processing logic 216 may obtain the scaling information from the image scaler 221 through at least a portion of the data lane, and may store the scaling information in the storage 212. However, according to some example embodiments, the scaling information processing logic 216 may receive the scaling information from the image scaler 221 through a communication interface other than the MIPI interface, for example, an I2C interface.

The video timer 213 may determine the timing of the vertical synchronization signal and the horizontal synchronization signal by referring to the scaling information stored in the storage 212. The video timer 213 may include counter circuits for determining the timing of the vertical synchronization signal and the timing of the horizontal synchronization signal.

The image processing logic 214 may obtain image data corresponding to the original image from the image sensor, the communication modem, the memory, and the like, and may transmit the image data to the packet generator 215. The packet generator 215 may generate display data transmitted to the display driving device 220 using the timing information of the vertical synchronization signal and the horizontal synchronization signal received from the video timer 213, and the image data received from the image processing logic 214.

Figure 8:
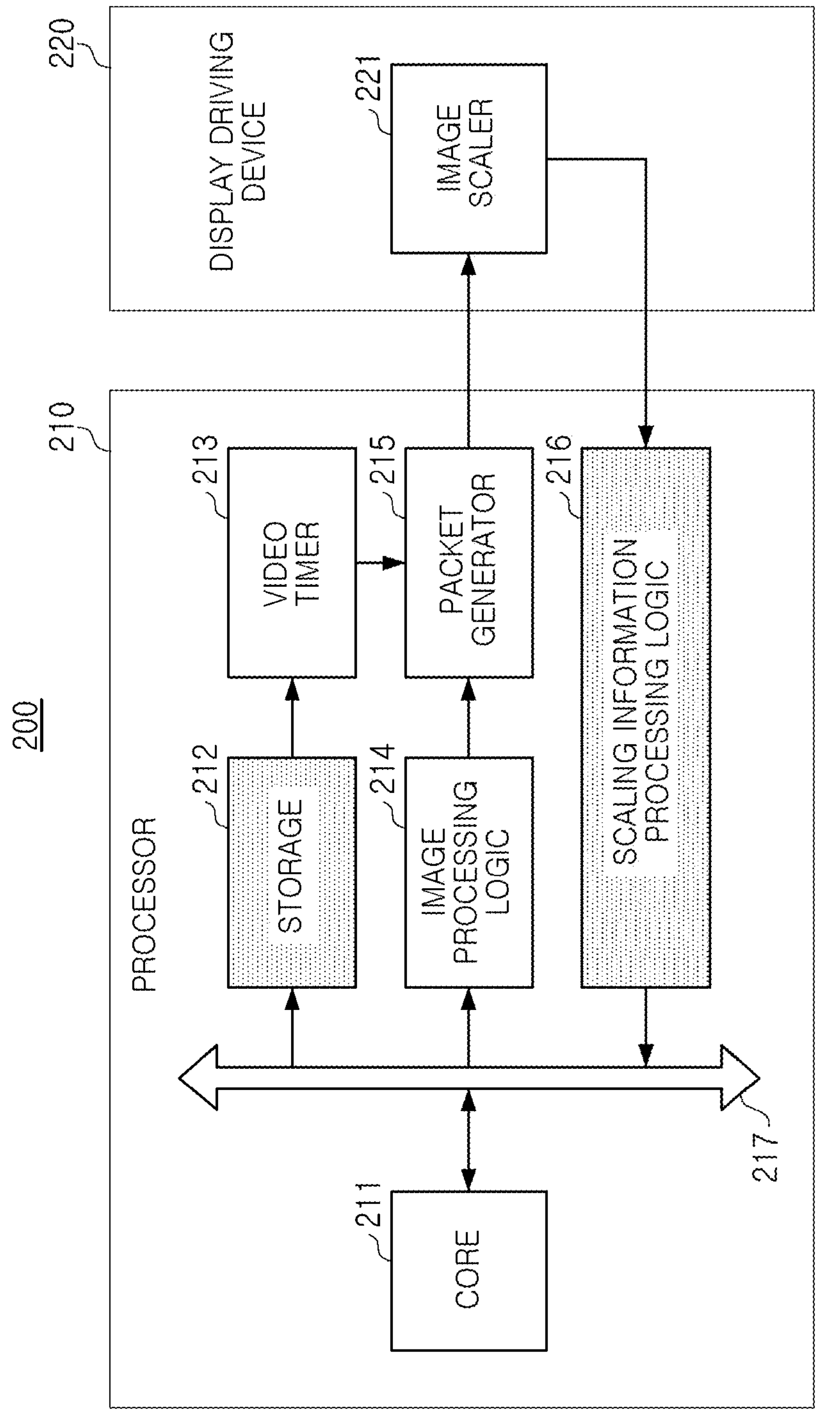

In the electronic device 200, first, as illustrated in FIG. 8, the image scaler 221 may transmit the scaling information to the scaling information processing logic 216. The scaling information may include the number and position of image pixels added in the upscaling operation of the image scaler 221, and the resolution of the result image generated by the upscaling operation, and may be transmitted through the data lane of the interface connecting the processor 210 and the display driving device 220. The scaling information processing logic 216 may store the scaling information in the storage 212.

Figure 9:
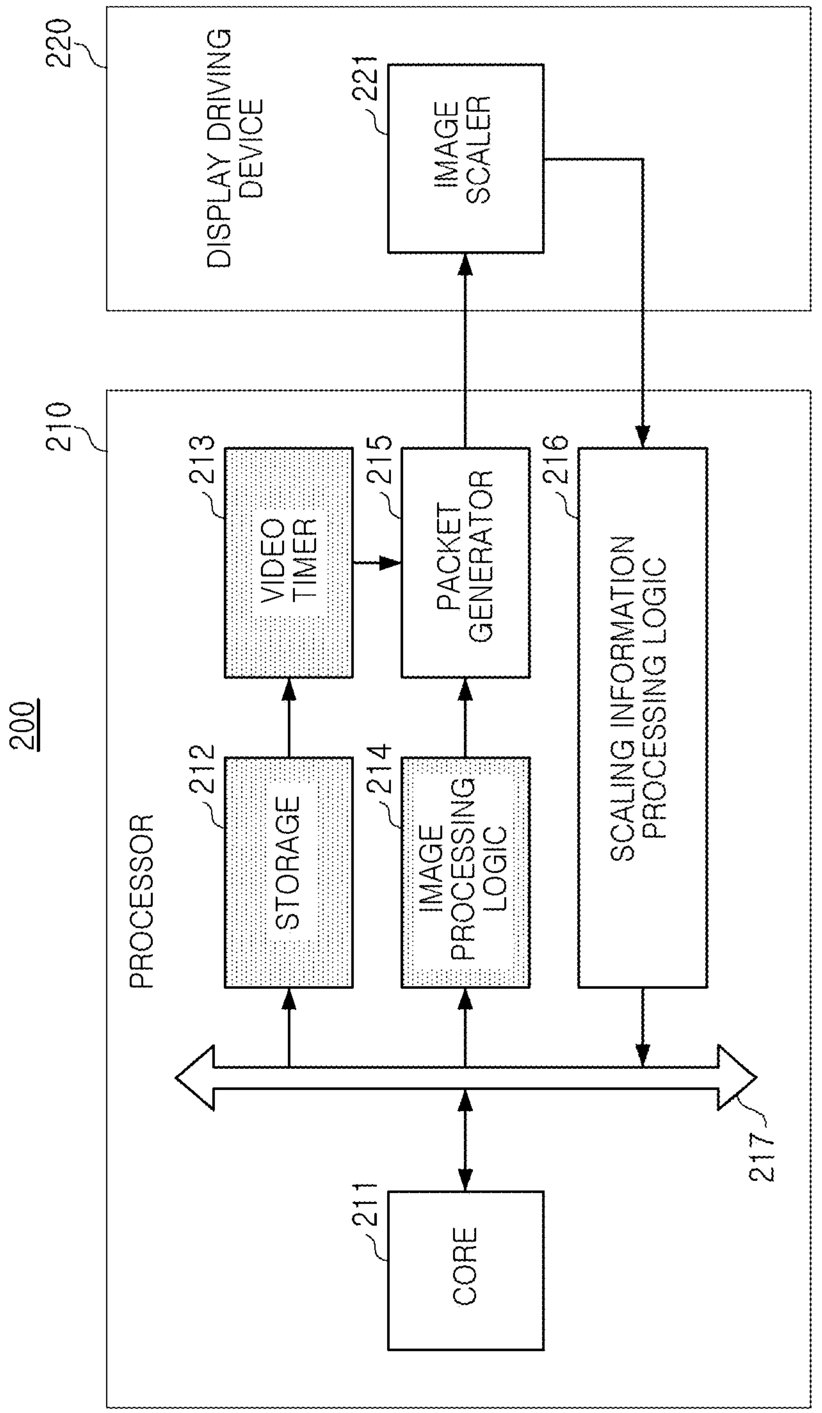

Next, referring to FIG. 9, the video timer 213 may generate a synchronization signal by referring to the scaling information stored in the storage 212. The video timer 213 may determine the timing of each of the vertical synchronization signal and the horizontal synchronization signal by referring to the scaling information, and may transmit the timing of each synchronization signal to the packet generator 215. Meanwhile, the image processing logic 214 may obtain image data corresponding to the original image from the image sensor, the communication modem, the memory, and the like, included in the electronic device 200, and may transmit the image data to the packet generator 215.

Figure 10:
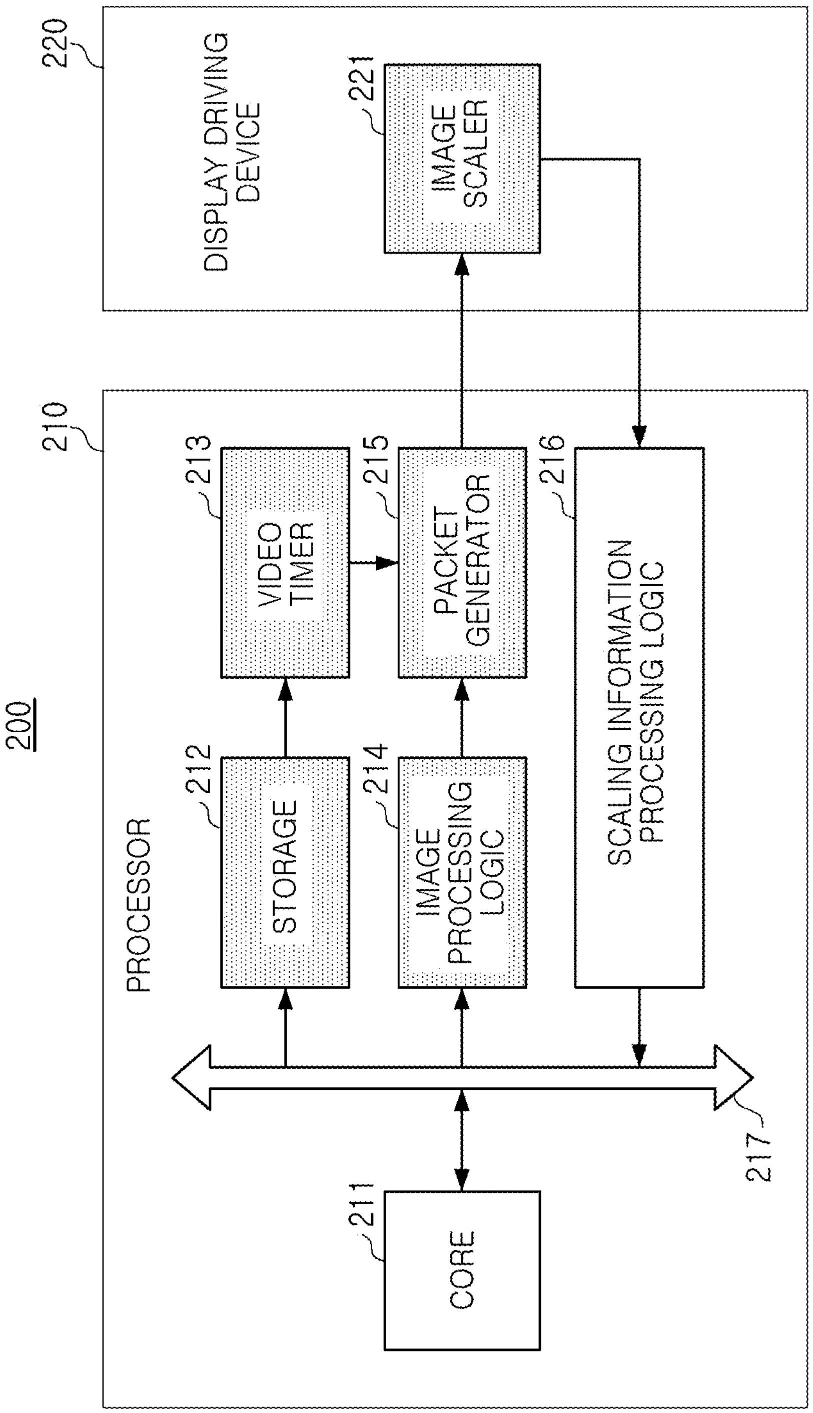

Referring to FIG. 10, the packet generator 215 may configure display data using the image data and the synchronization signal, and may transmit the display data to the image scaler 221. For example, the packet generator 215 may first transmit the vertical synchronization signal based on the timing received from the video timer 213, and may transmit the horizontal synchronization signals by a predetermined (or, alternatively, desired or selected) number of times during the active section of the vertical synchronization signal. The number of times at which the horizontal synchronization signals are transmitted may correspond to the number of horizontal lines included in the result image generated by the upscaling operation of the image scaler 221.

The video timer 213 may generate the timing of each of the active synchronization signal matched to a portion of the image data received from the image processing logic 214, and the blank synchronization signal not matched to the image data, based on the scaling information. The packet generator 215 may generate an active packet obtained by matching a portion of the image data received from the image processing logic 214 to the active synchronization signal at the transmission timing of the active synchronization signal. On the other hand, in the transmission timing of the blank synchronization signal, the packet generator 215 may generate a blank packet with a blank synchronization signal without image data.

In some example embodiments, the packet generator 215 may request the image processing logic 214 to transmit the image data or block transmission of image data from the image processing logic 214, based on timing information received from the video timer 213. The packet generator 215 may request the image processing logic 214 to transmit the line image data matching the corresponding active synchronization signal at the transmission timing of the active synchronous signal, and may request the image processing logic 214 to stop transmitting the line image data at the transmission timing of the blank synchronization signal.

As described above, in some example embodiments of the present disclosure, the image scaler 221 is included in the display driving device 220, and the processor 210 may generate synchronization signals necessary (or, alternatively, desired or selected) for the upscaling operation of the image scaler 221 and may transmit the synchronization signals to the image scaler 221. Since the processor 210 generates only the synchronization signals required for the upscaling operation and transmits the synchronization signals to the image scaler 221 without increasing the resolution of the original image, it may be possible to minimize (or reduce) an increase in the amount of data transmitted and an increase in power consumption between the processor 210 and the display driving device 220. Additionally, since the image scaler 221 may perform the upscaling operation in synchronization with the synchronization signal received from the processor 210 without a separate internal memory for storing the original image, the integration of the display driving device 220 may be improved.

For example, according to some example embodiments, there may be an increase in speed, accuracy, and/or power efficiency of the device based on the above methods. Therefore, the improved devices and methods overcome the deficiencies of the conventional devices and methods of upscaling related to image data while reducing resource consumption, data accuracy, and resource allocation (e.g., latency). Further, there is an improvement in communication and reliability in the device by providing the abilities disclosed herein.

FIGS. 11 to 14 are views illustrating an operation of an electronic device according to some example embodiments of the present disclosure.

Figure 7:
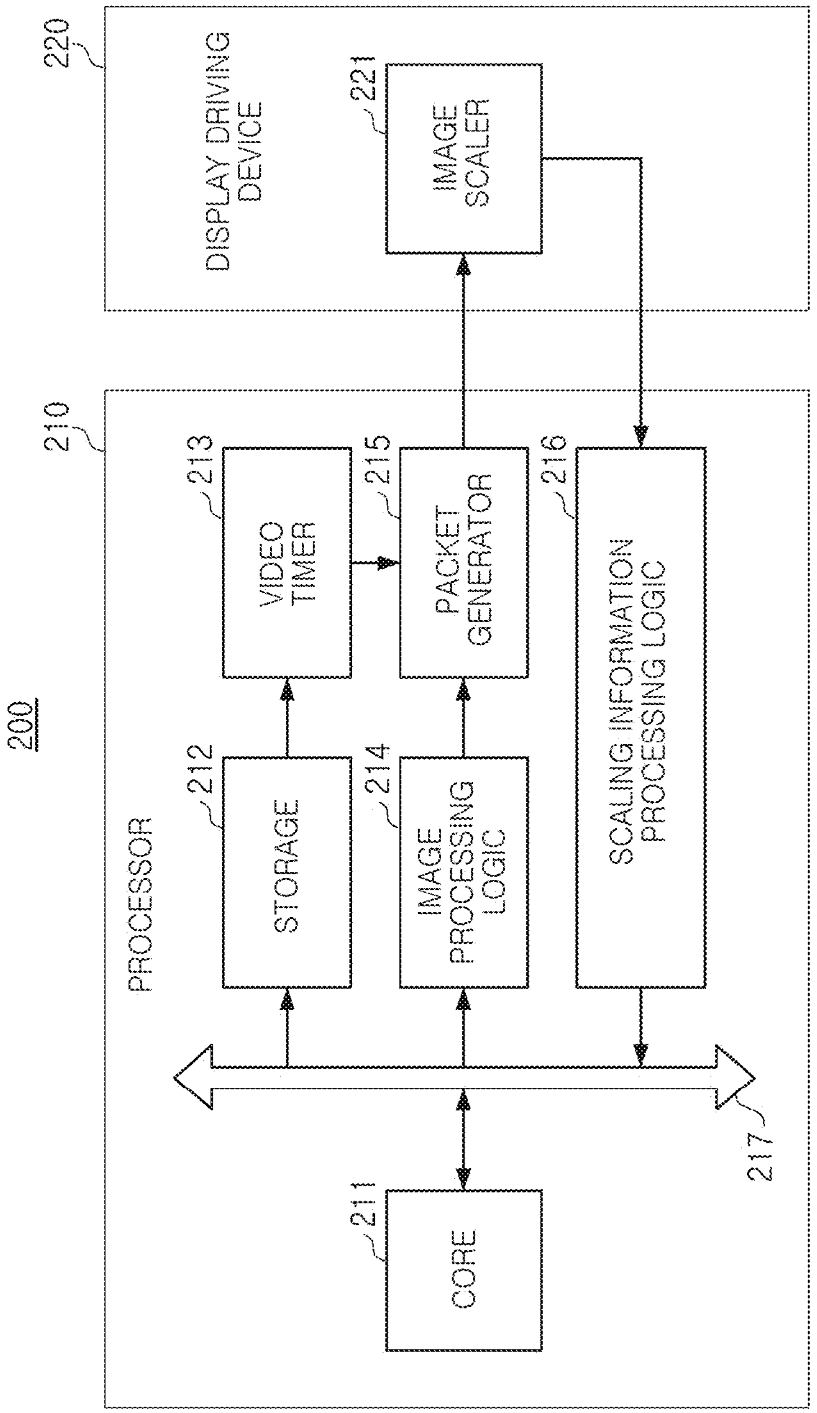
FIGS. 7 to 10 are views illustrating an operation of an electronic device according to some example embodiments of the present disclosure.

Hereinafter, for convenience of explanation, an operation of the electronic device 200 will be described with reference to FIG. 7.

Figure 11:
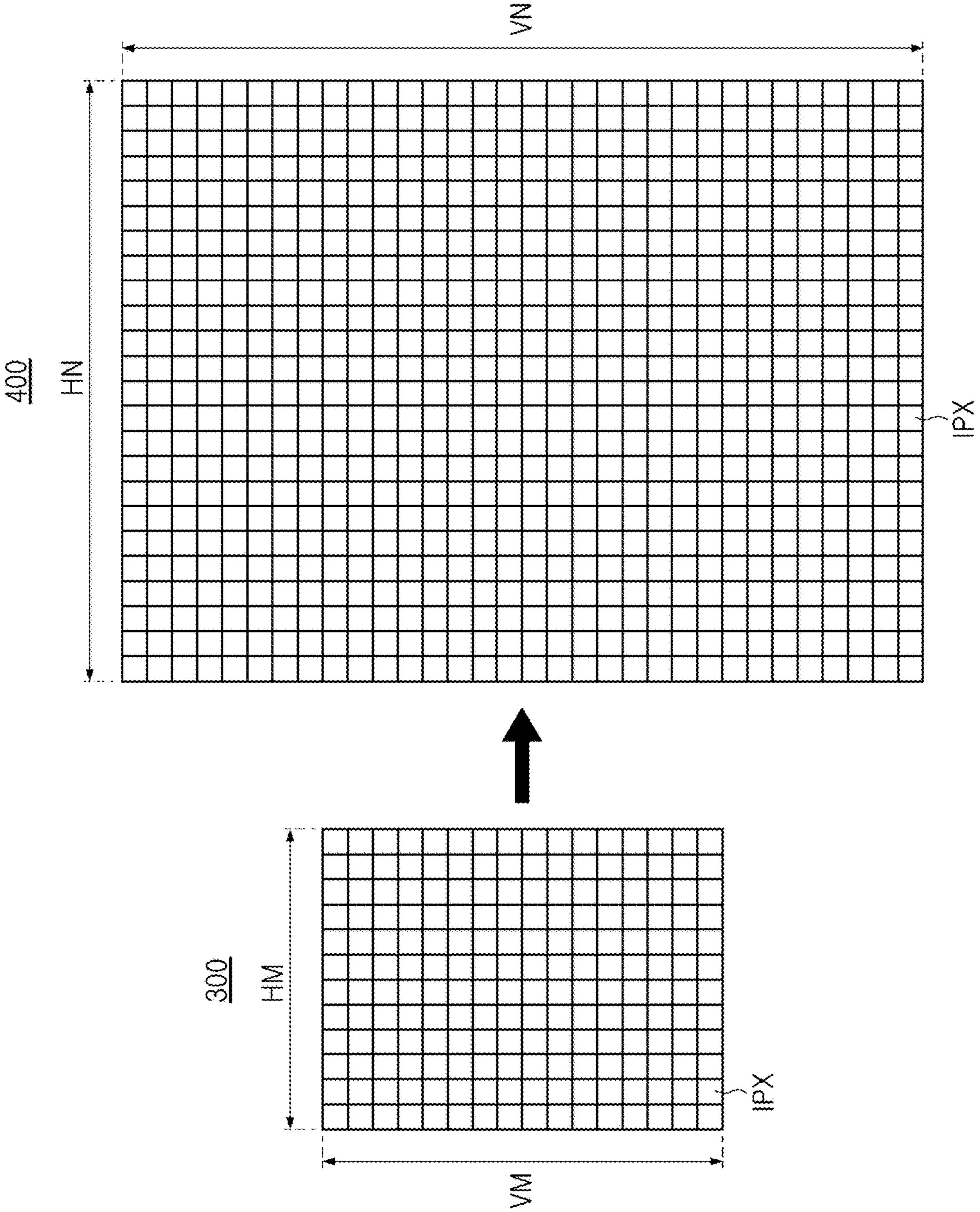
FIGS. 11 to 14 are views illustrating an operation of an electronic device according to some example embodiments of the present disclosure.

FIG. 11 may be a view illustrating an original image 300 acquired by an image processing logic 214 of a processor 210 and a result image 400 generated by an upscaling operation of an image scaler 221. Referring to FIG. 11, first resolution of the original image 300 may be determined by the number HM of image pixels IPX arranged in the horizontal direction and the number VM of image pixels IPX arranged in the vertical direction. Second resolution of the result image 400 may also be determined by the number HN of the image pixels IPX arranged in the horizontal direction and the number VN of the image pixels IPX arranged in the vertical direction.

Referring to FIG. 11, although the image scaler 221 is illustrated as increasing the resolution of the original image 300 in both the horizontal and vertical directions, the image scaler 221 is not necessarily limited to this form. In some example embodiments illustrated in FIG. 11, the image scaler 221 may increase the resolution of the original image 300 by two times in each of the horizontal and vertical directions. For example, the number of horizontal lines included in the original image 300 may be 16, and the number of horizontal lines included in the result image 400 may be 32.

Figure 12:
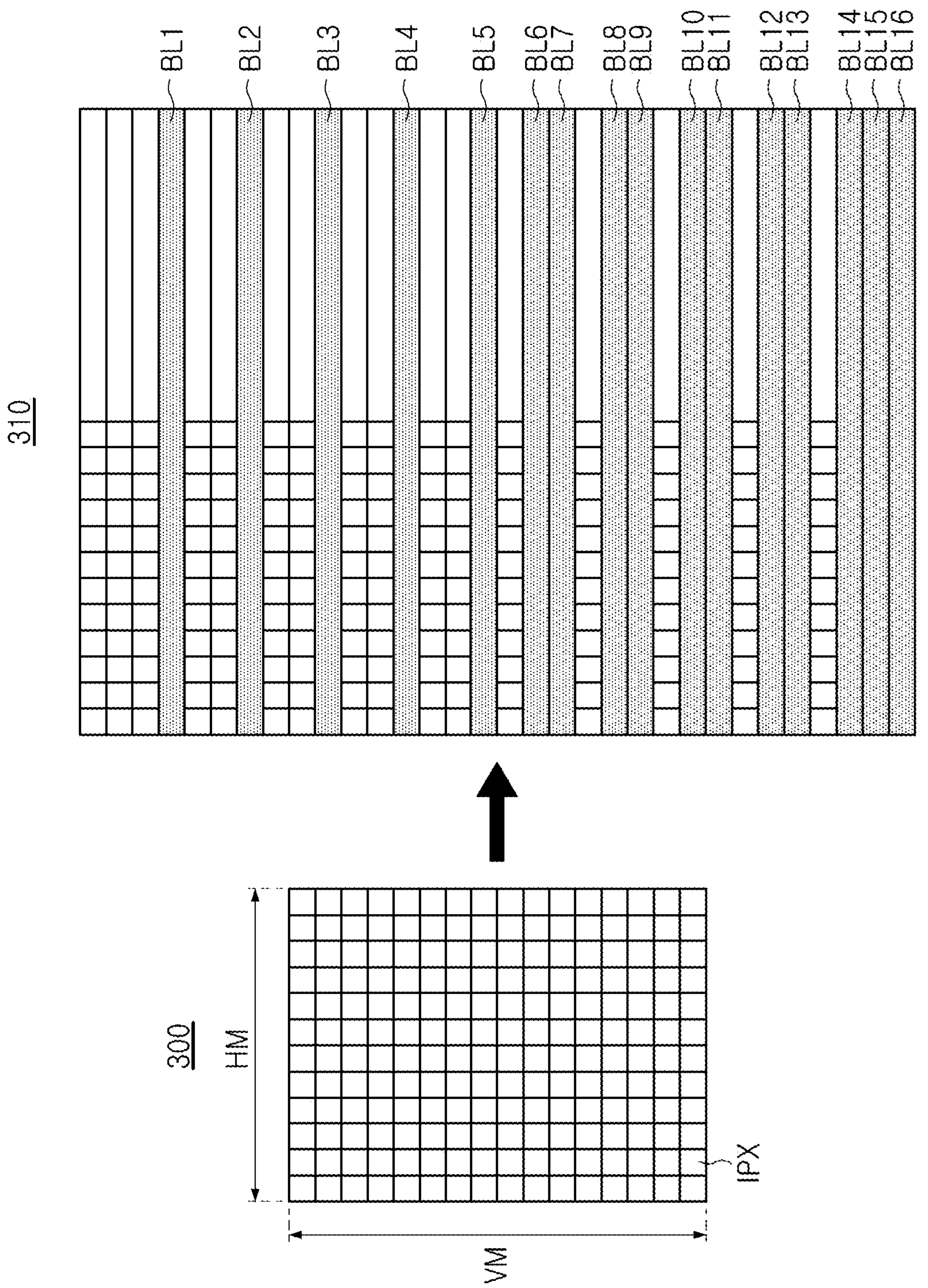

FIG. 12 may be a view illustrating a method of generating display data 310 to be transmitted to the image scaler 221, based on the original image 300, by a packet generator 215 of a processor 210. Referring to FIG. 12, the display data 310 may include a plurality of blank lines BL1 to BL16 added to the original image 300 in the vertical direction. The number of blank lines BL1 to BL16 and the position and/or order in which the blank lines BL1 to BL16 are inserted may be determined by an upscaling pattern specified by the image scaler 221. The image scaler 221 may generate scaling information including at least a portion of the number, the insertion position, and the order of blank lines BL1 to BL16 and may transmit the scaling information to the processor 210.

The scaling information may be stored in a storage 212, and a video timer 213 may generate synchronization signals by referring to the scaling information. For example, the video timer 213 may generate a vertical synchronization signal by referring to the resolution of the result image 400. One cycle of the vertical synchronization signal and the length of the active section may vary, depending on the resolution of the result image 400.

The video timer 213 may generate horizontal synchronization signals by referring to the number of horizontal lines included in the original image 300 and the number and position of blank lines BL1 to BL16 included in the scaling information. For example, the number of times at which the video timer 213 outputs the horizontal synchronization signals during one cycle of the vertical synchronization signal may be determined depending on the number of horizontal lines included in the original image 300 and the number of blank lines BL1 to BL16.

In some example embodiments, the video timer 213 may determine the length of the horizontal synchronization signal by referring to the number of image pixels IPX arranged in the horizontal direction in the result image 400. For example, the video timer 213 may maintain the length of the active section in the horizontal synchronization signal generated according to the resolution of the original image 300 (for example, the video timer 213 may maintain the length of the active section without change for a desired or selected period of time) and may increase a length of a front porch section, and may output the horizontal synchronization signal having the front porch section of an increased length to the packet generator 215.

Figure 13:
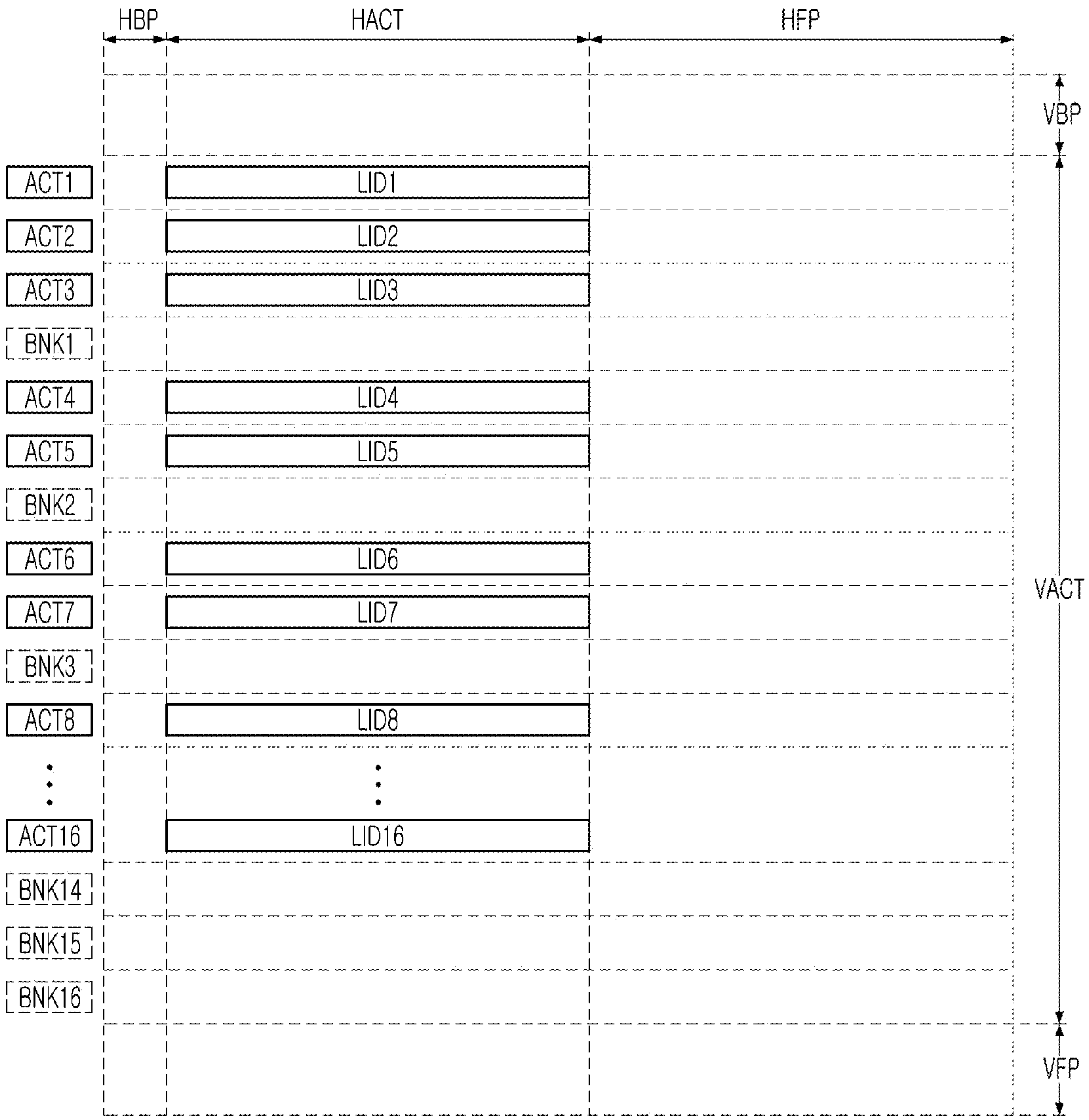

The packet generator 215 may generate a data packet by matching image data of the original image 300 to the vertical synchronization signal and the horizontal synchronization signal received from the video timer 213. Referring to FIG. 13, the video timer 213 may transmit the vertical synchronization signal and the horizontal synchronization signal to the packet generator 215. In some example embodiments illustrated in FIG. 13, the video timer 213 may output a plurality of horizontal synchronization signals ACT1 to ACT16 and BNK1 to BNK16 to the packet generator 215 during the active section VACT of the vertical synchronization signal. The plurality of horizontal synchronization signals ACT1 to ACT16 and BNK1 to BNK16 may include active synchronization signals ACT1 to ACT16 and blank synchronization signals BNK1 to BNK16.

The packet generator 215 may generate the data packet according to the timing of each of the horizontal synchronization signals ACT1 to ACT16 and BNK1 to BNK16 and transmit the data packet to the image scaler 221. For example, the packet generator 215 may generate a first data packet by matching first line image data LID1 corresponding to a first horizontal line of the original image 300 to a first active synchronization signal ACT1 transmitted by the video timer 213, and may transmit the first data packet to the image scaler 221. The first data packet may be transmitted to the image scaler 221. The first data packet may include a synchronization data packet corresponding to timing information of the first active synchronization signal ACT1, and an image data packet corresponding to the first line image data LID1.

In a similar manner, the packet generator 215 may transmit a second data packet obtained by matching second line image data LID2 corresponding to a second horizontal line of the original image 300 to the second active synchronization signal ACT2, to the image scaler 221. Additionally, the packet generator 215 may transmit a third data packet obtained by matching third line image data LID3 corresponding to a third horizontal line of the original image 300 to the third active synchronization signal ACT3, to the image scaler 221. As described above, the second data packet may include a synchronization data packet corresponding to timing information of the second active synchronization signal ACT2 and an image data packet corresponding to the second line image data LID2, and the third data packet may include a synchronization data packet corresponding to timing information of the third active synchronization signal ACT3 and an image data packet corresponding to the third line image data LID3.

In some example embodiments illustrated in FIG. 13, the packet generator 215 may match the first to third line image data LID1 to LID3 included in the original image 300 to the first to third active synchronization signals ACT1 to ACT3 after the active section VACT of the vertical synchronization signal begins, and may transmit the first to third line image data LID1 to LID3 in order. The transmission order and pattern may be a request from the image scaler 221, and the transmission order and pattern may be included in the scaling information.

In some example embodiments described with reference to FIG. 13, the image scaler 221 may require the first to third line image data LID1 to LID3 as reference data to generate a new image pixel IPX required for the upscaling operation of the original image 300. However, after the active section VACT of the vertical synchronization signal begins, the number of line image data transmitted to the image scaler 221 may vary, depending on an algorithm employed in the image scaler 221.

Referring to FIG. 13, the video timer 213 of the processor 210 may increase a front porch section HFP in the horizontal synchronization signal generated according to the output of the original image, and may generate horizontal synchronization signals ACT1 to ACT16 and BNK1 to BNK16 as illustrated in FIG. 13. Accordingly, in each of the horizontal synchronization signals ACT1 to ACT16 and BNK1 to BNK16 transmitted from the packet generator 215 to the display driving device 220, the front porch section HFP may appear longer than a back porch section HBP. However, according to some example embodiments, the video timer 213 may adjust the back porch section HBP instead of the front porch section HFP in the horizontal synchronization signal. Alternatively, according to some example embodiments, the video timer 213 may adjust both the front porch section HFP and the back porch section HBP in the horizontal synchronization signal.

The image scaler 221 may add image pixels IPX to each of the first to third line image data LID1 to LID3. For example, the image scaler 221 may generate pixel data of image pixels IPX to be added to each of the first to third line image data LID1 to LID3 during the front porch section HFP of each of the first to third active synchronization signals ACT1 to ACT3. As previously described with reference to FIG. 11, the number of pixels included in the result image 400 in the horizontal direction may be twice the number of pixels included in the original image 300. In this case, the image scaler 221 may additionally generate the same number of image pixels IPX as the number of image pixels IPX included in the first line image data LID1.

Figure 14:
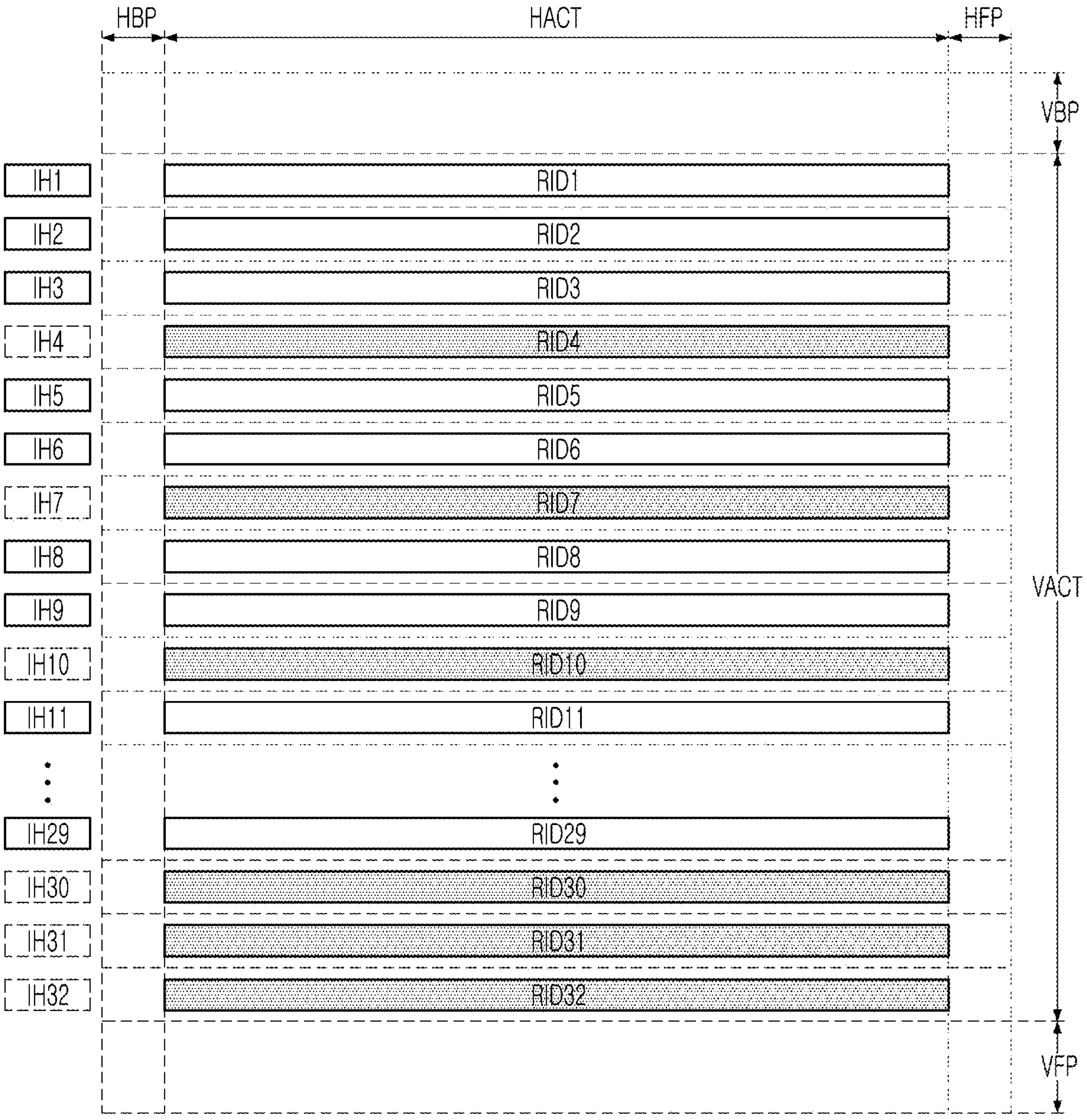

Referring to FIG. 14, first result line image data RID1 may be generated by the added image pixels IPX. The image scaler 221 may adjust the active section HACT and the front porch section HFP of the first active synchronization signal ACT1 in consideration of the image pixels IPX added to the first line image data LID1, and may generate a first internal horizontal synchronization signal IH1 as illustrated in FIG. 14.

The image scaler 221 may transmit the first internal horizontal synchronization signal IH1 and the first result line image data RID1 to a timing controller. The timing controller may control a gate driver so that one gate line is selected on the display panel during the active section HACT of the first internal horizontal synchronization signal IH1. Additionally, the timing controller may control a source driver so that a data signal based on the first result line image data RID1 is input to the pixels connected to a gate line selected by the gate driver.

The packet generator 215 may receive the first blank synchronization signal BNK1 from the video timer 213 following the third active synchronization signal ACT3. The first blank synchronization signal BNK1 may be a horizontal synchronization signal corresponding to the first blank line BL1 described above with reference to FIG. 12. The packet generator 215 may stop receiving line image data from an image processing logic 214 in response to the first blank synchronization signal BNK1. The packet generator 215 may generate a fourth data packet including the first blank synchronization signal BNK1 and transmit the fourth data packet to the image scaler 221. In other words, the first blank synchronization signal BNK1 may be transmitted to the image scaler 221 without matching line image data LID1 to LID16 included in the original image 300.

The image scaler 221 may generate a fourth internal horizontal synchronization signal IH4 by referring to the timing of the first blank synchronization signal BNK1, and may generate fourth result line image data RID4 to be output to the display panel in the active section HACT of the fourth internal horizontal synchronization signal IH4. In some example embodiments, the image scaler 221 may generate fourth result line image data RID4 by referring to the first to third line image data LID1 to LID3 received before the first blank synchronization signal BNK1. The number of line image data of the original image 300 required to generate the result line image data to be output to the display panel by being synchronized to the first blank synchronization signal BNK1 primally received among the blank synchronization signals BNK1 to BNK16 may vary depending on some example embodiments, for example, depending on an upscaling algorithm adopted in the image scaler 221.

Referring to FIG. 14, by repeating the operation described above, the image scaler 221 may sequentially generate 32 result line image data RID1 to RID32, and the result line image data RID1 to RID32 may be output to the display panel according to the timing of the internal horizontal synchronization signals IH1 to IH32. The image scaler 221 may sequentially generate result line image data RID1 to RID32 to implement the result image 400 using the data packet received from the packet generator 215. Accordingly, the upscaling function may be implemented in the display driving device 220 without a separate internal memory for storing data received from the processor 210, and the integration of the display driving device 220 may be improved.

Additionally, the display data transmitted by the packet generator 215 may include a plurality of horizontal synchronization signals ACT1 to ACT16 and BNK1 to BNK16, and line image data LID1 to LID16 corresponding to the original image 300. Accordingly, the upscaling function may be implemented in the display driving device 220 while minimizing (or reducing) an increase in the amount of data transmitted, and the power consumption of the electronic device 200 may be reduced.

Figure 15:
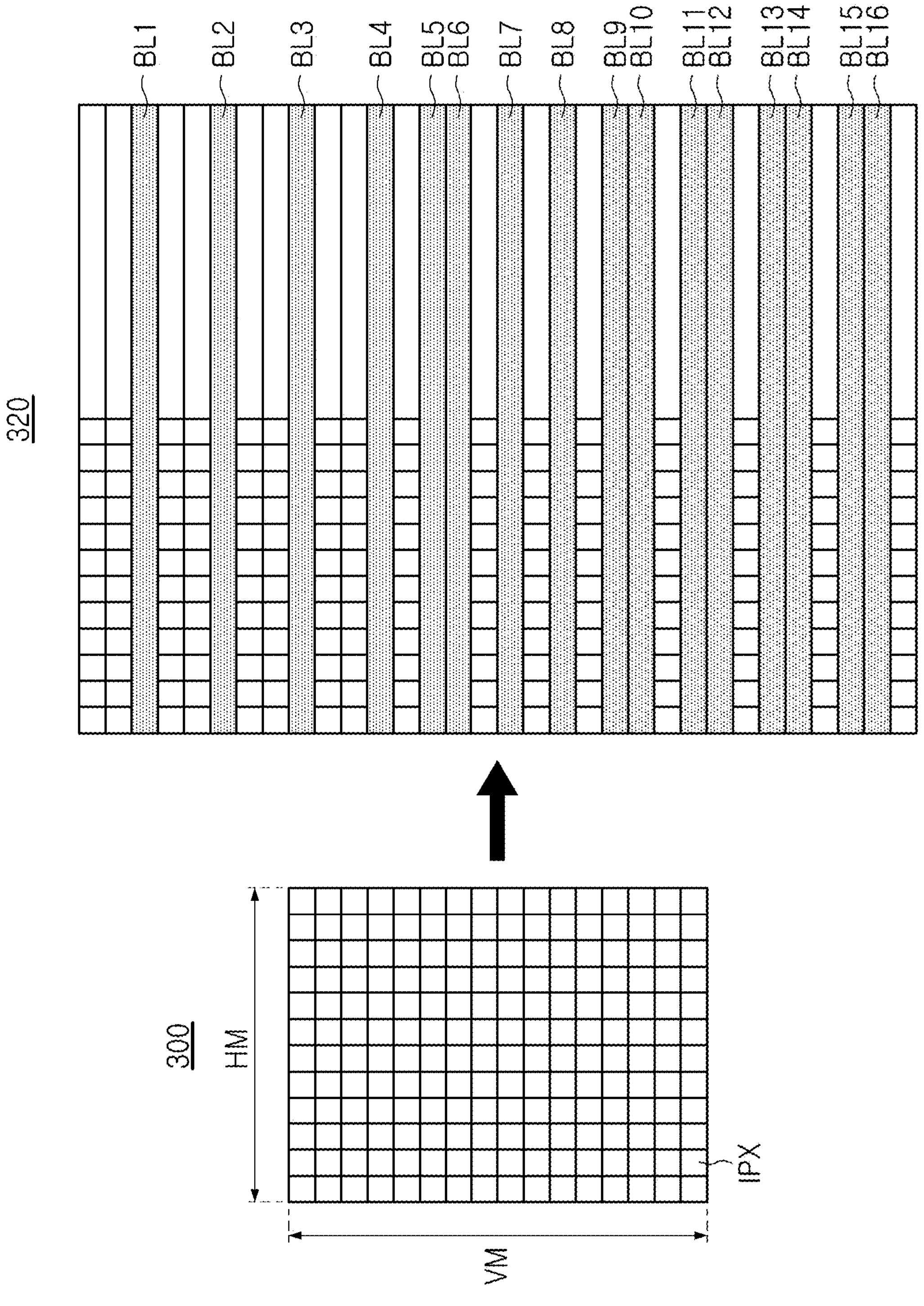
FIGS. 15 to 17 are views illustrating an operation of an electronic device according to some example embodiments of the present disclosure.
Figure 16:
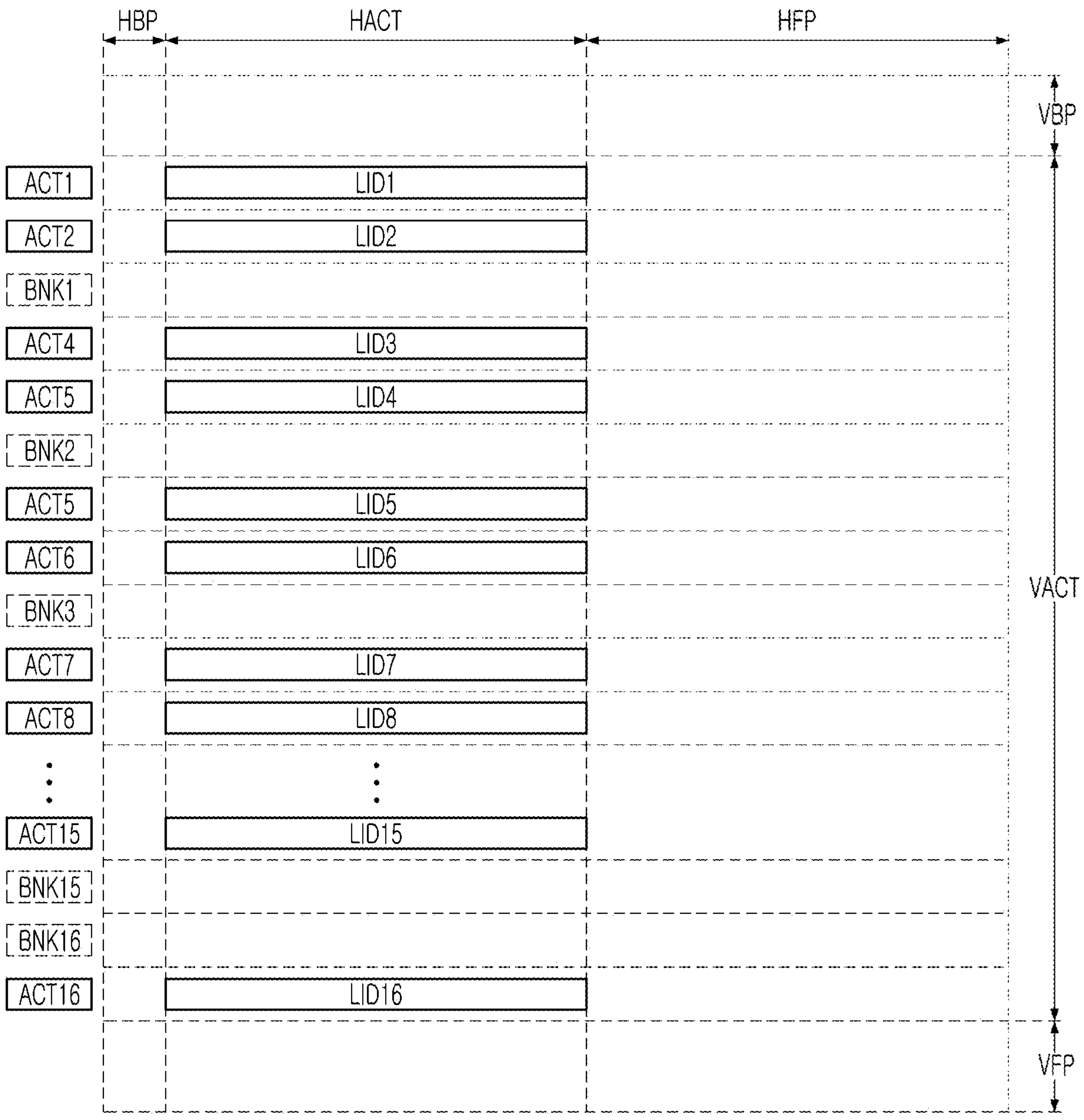
Figure 17:
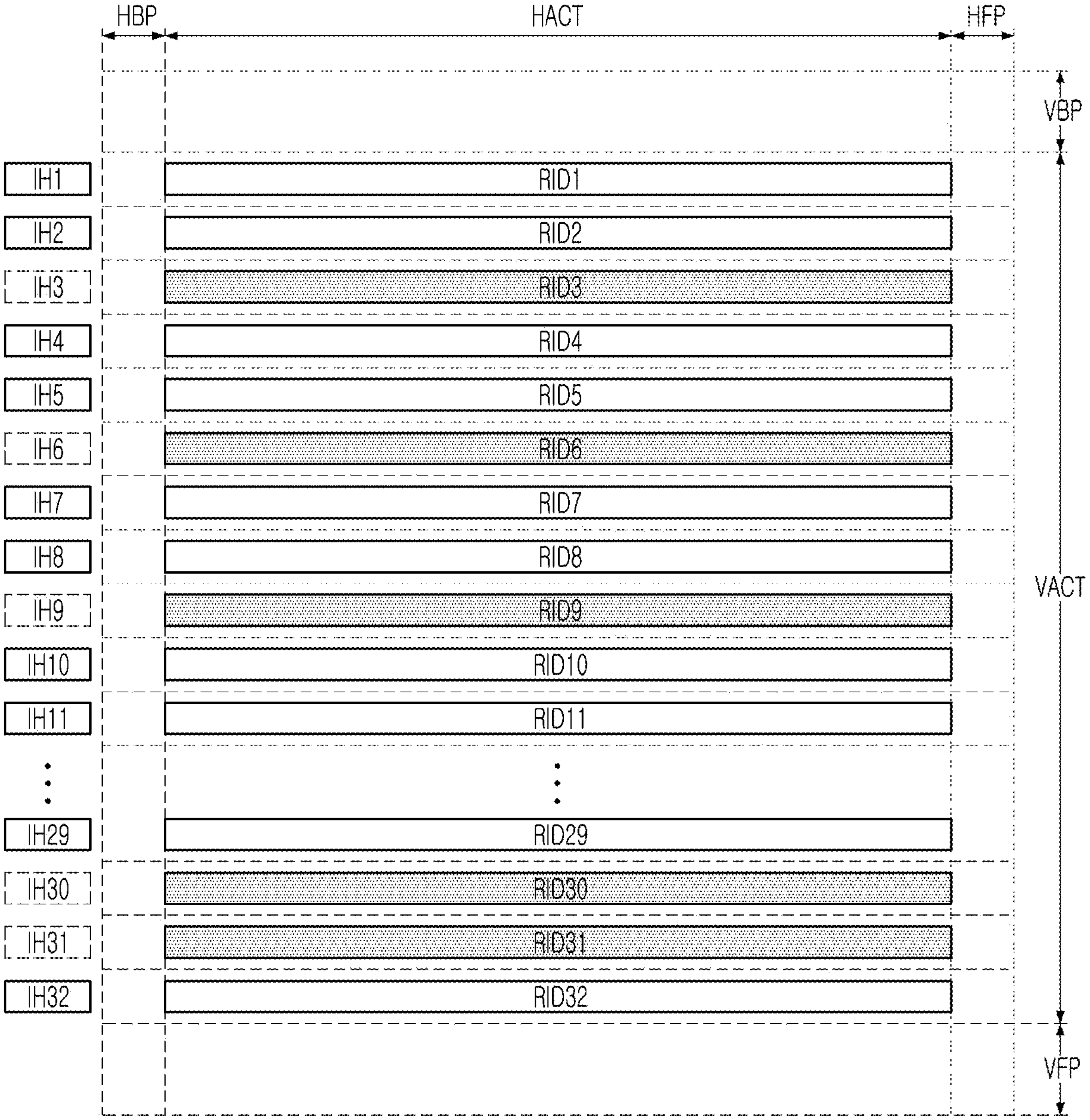
Figure 18:
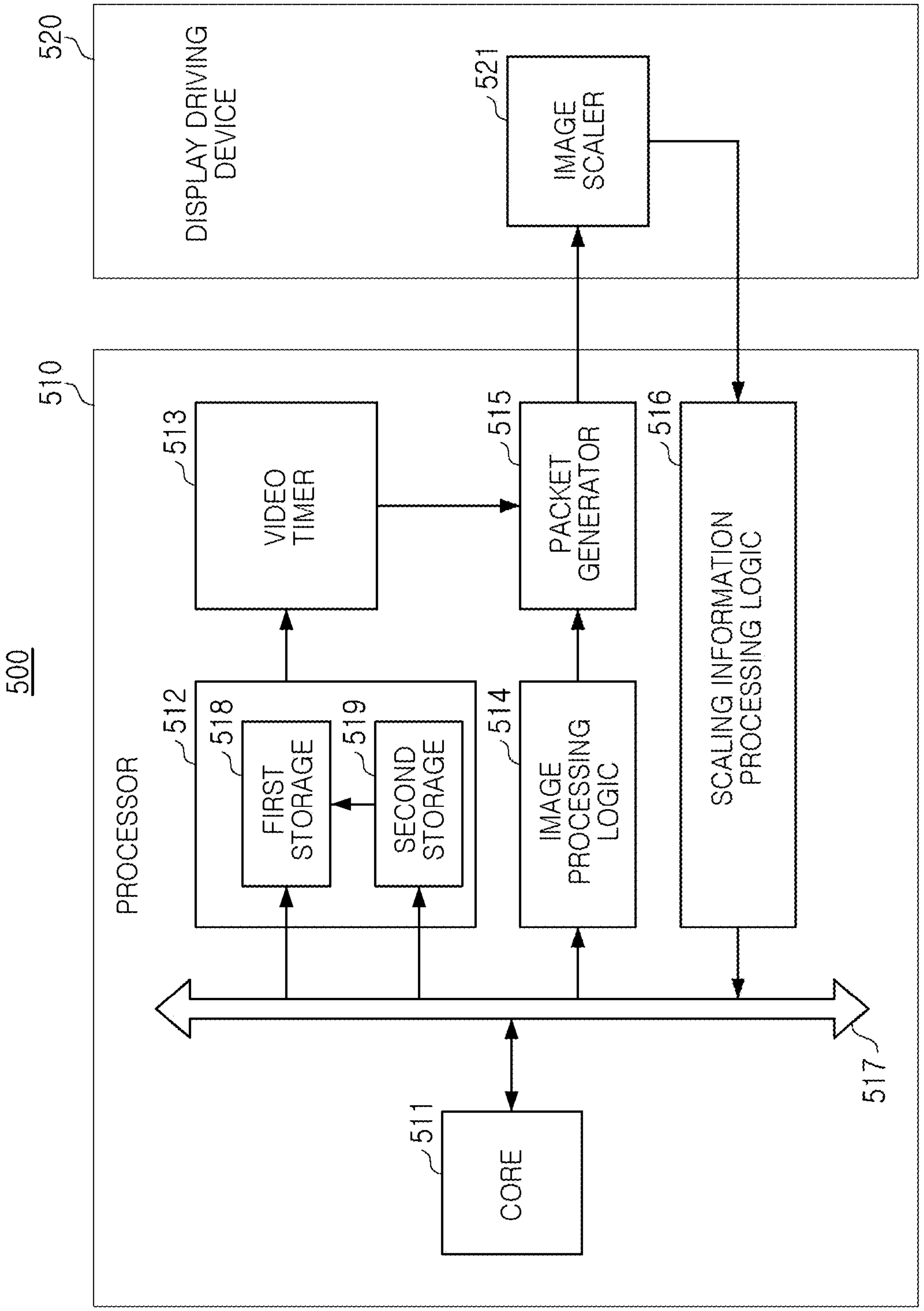
FIGS. 18 to 21 are views illustrating an operation of an electronic device according to some example embodiments of the present disclosure.

FIGS. 15 to 17 are views illustrating an operation of an electronic device according to some example embodiments of the present disclosure.

Hereinafter, for convenience of explanation, the operation of the electronic device 200 will be described with reference to FIG. 7.

FIG. 15 may be a view illustrating a method of generating display data 320 to be transmitted to an image scaler 221, based on an original image 300, by a packet generator 215 of a processor 210. Referring to FIG. 15, display data 320 may include a plurality of blank lines BL1 to BL16 added to the original image 300 in the vertical direction. An upscaling pattern of specifying the number of blank lines BL1 to BL16 and the position and/or order in which the blank lines BL1 to BL16 are inserted may be included in the scaling information generated by the image scaler 221 and then transmitted to the processor 210, and may be stored in a storage 212.

A video timer 213 may generate synchronization signals by referring to the scaling information. For example, the video timer 213 may generate a vertical synchronization signal with reference to the resolution of the result image 400. Depending on the resolution of the result image 400, one cycle of the vertical synchronization signal and the length of the active section may vary. As compared to some example embodiments previously described with reference to FIG. 12, in some example embodiments illustrated in FIG. 15, the insertion positions and orders of the blank lines BL1 to BL16 may be different from each other.

The video timer 213 may generate horizontal synchronization signals by referring to the number of horizontal lines included in the original image 300 and the number and position of blank lines BL1 to BL16 included in the scaling information. For example, the number of times at which the video timer 213 outputs the horizontal synchronization signals during one cycle of the vertical synchronization signal may be determined depending on the number of horizontal lines included in the original image 300 and the number of blank lines BL1 to BL16.

In some example embodiments, the video timer 213 may determine the length of the horizontal synchronization signal by referring to the number of image pixels IPX arranged horizontally in the result image 400. For example, the video timer 213 may unchangeably maintain the length of the active section in the horizontal synchronization signal generated according to the resolution of the original image 300 (for example, the video timer 213 may maintain the length of the active section without change for a desired or selected period of time) and increase a length of a front porch section, and may output the horizontal synchronization signal having the front porch section of an increased length to the packet generator 215.

The packet generator 215 may generate a data packet by matching image data of the original image 300 to the vertical synchronization signal and the horizontal synchronization signal received from the video timer 213. Referring to FIG. 16, the video timer 213 may sequentially output a plurality of horizontal synchronization signals ACT1 to ACT16 and BNK1 to BNK16 including active synchronization signals ACT1 to ACT16 and blank synchronization signals BNK1 to BNK16 during an active section VACT of the vertical synchronization signal, to the packet generator 215.

The packet generator 215 may generate a data packet including the timing of each of the horizontal synchronization signals ACT1 to ACT16 and BNK1 to BNK16 and may transmit the data packet to the image scaler 221. In one example, the packet generator 215 generates a first data packet by matching first line image data LID1 corresponding to a first horizontal line of the original image 300 to a first active synchronization signal ACT1 transmitted by the video timer 213, and may transmit the first data packet to the image scaler 221. In a similar manner, the packet generator 215 may transmit a second data packet obtained by matching second line image data LID2 corresponding to a second horizontal line of the original image 300 to a second active synchronization signal ACT2, to the image scaler 221.

In some example embodiments illustrated in FIG. 16, the packet generator 215 may match the first and second line image data LID1 and LID2 included in the original image 300 after the active section VACT of the vertical synchronization signal begins, to the first and second active synchronization signals ACT1 and ACT2, and may sequentially transmit the first and second line image data LID1 and LID2. The transmission order may be determined by the scaling information received from the image scaler 221.

According to the algorithm employed in the image scaler 221, the number of line image data (for example, continuously or discretely) transmitted to the image scaler 221 after the active section VACT of the vertical synchronization signal begins may vary. As compared to the example embodiment described with reference to FIG. 13, referring to FIG. 16, in some example embodiments, the image scaler 221 may require the first and second line image data LID1 and LID2 as reference data to generate a new image pixel IPX required for the upscaling operation of the original image 300.

The image scaler 221 may add image pixels IPX to each of the first and second line image data LID1 and LID2. In the horizontal direction, the number of pixels included in the result image may be greater than the number of pixels included in the original image 300, and thus, the image scaler 221 may generate first result line image data RID1 by inserting additional image pixels IPX into the image pixels IPX included in the first line image data LID1.

Referring to FIG. 17, the image scaler 221 may generate a first internal horizontal synchronization signal IH1 by adjusting the active section HACT and the front porch section HFP of the first active synchronization signal ACT1, in consideration of the image pixels IPX added to the first line image data LID1. For example, the active section HACT of the first internal horizontal synchronization signal IH1 may be longer than the active section HACT of the first active synchronization signal ACT1, and the front porch section HFP of the first internal horizontal synchronization signal IH1 may be shorter than the front porch section HFP of the first active synchronization signal ACT1. A total length of the first internal horizontal synchronization signal IH1 may be substantially the same as a total length of the first active synchronization signal ACT1.

The display driving device 220 may drive the display panel in response to the first internal horizontal synchronization signal IH1 and the first result line image data RID1 generated by the image scaler 221. The display driving device 220 may select one gate line on the display panel during the active section HACT of the first internal horizontal synchronization signal IH1, and may input the data signal based on the first result line image data RID1 to the pixels connected to the selected gate line.

The packet generator 215 may receive the first blank synchronization signal BNK1 from the video timer 213 following the second active synchronization signal ACT2. The first blank synchronization signal BNK1 may be a horizontal synchronization signal corresponding to the first blank line BL1 illustrated in FIG. 15. The packet generator 215 may stop receiving line image data from an image processing logic 214 in response to the first blank synchronization signal BNK1, and may generate a third data packet including the first blank synchronization signal BNK1 and may transmit the third data packet to the image scaler 221.

The image scaler 221 may generate a third internal horizontal synchronization signal IH3 by referring to the timing of the first blank synchronization signal BNK1, and generate third result line image data RID3 to be output to the pixels connected to the gate line selected by the third internal horizontal synchronization signal IH3. The image scaler 221 may generate third result line image data RID3 by referring to the first and second line image data LID1 and LID2 received before the first blank synchronization signal BNK1. In some example embodiments described with reference to FIGS. 15 to 17, the upscaling algorithm used by the image scaler 221 may require at least two of the line image data LID1 to LID16 included in the original image 300 so as to generate result line image data RID3 to be output to the display panel at the timing of the first blank synchronization signal BNK1.

Referring to FIG. 17, by repeating the operation described above, the image scaler 221 may generate 32 result line image data RID1 to RID32, and the result line image data RID1 to RID32 may be sequentially output to the display panel according to the timing of the internal horizontal synchronization signals IH1 to IH32. The image scaler 221 may generate the result line image data RID1 to RID32 to display the result image 400 according to the order of receiving data packets from the packet generator 215. Accordingly, the upscaling function may be implemented in the display driving device 220 without a separate internal memory for storing data received from the processor 210, and the integration degree of the display driving device 220 may be improved.

Additionally, the display data transmitted by the packet generator 215 may include a plurality of horizontal synchronization signals ACT1 to ACT16 and BNK1 to BNK16, and line image data LID1 to LID16 corresponding to the original image 300. Accordingly, the upscaling function may be implemented in the display driving device 220 while minimizing (or reducing) the increase in the amount of data transmitted, and the power consumption of the electronic device 200 may be reduced.

In some example embodiments of the present disclosure, the scaling information may be exchanged between the processor 210 and the display driving device 220 prior to executing the upscaling operation. However, according to some example embodiments, the scaling information may be updated between frames included in the result image.

For example, in the example embodiment described with reference to FIGS. 12 to 14, when thirty-second result line image data RID32 corresponding to a last horizontal line of one frame included in the result image is output according to a thirty-second internal horizontal synchronization signal IH32, the image scaler 221 may determine that display data transmission of the corresponding frame is terminated. Then, the image scaler 221 may determine changes or updates to the scaling information and notify the processor 210 thereof until a next frame begins. When updating the scaling information, new scaling information may be transmitted to the scaling information processing logic 216 of the processor 210 in the front porch section VFP of the vertical synchronization signal.

For example, when the original image includes consecutive first and second frames (for example, such that the first and second frames are immediately consecutive), a first frame may be upscaled by a first upscaling pattern as in some example embodiments described with reference to FIGS. 12 to 14, and a second frame may be upscaled by a second upscaling pattern as in some example embodiments described with reference to FIGS. 15 to 17. The result image may include a first result frame obtained by upscaling the first frame, and a second result frame obtained by upscaling the second frame, and the first result frame and the second result frame may have the same resolution.

However, for upscaling, the positions in which the blank lines BNK1 to BNK16 are inserted may be different from each other, and thus, the order in which the video timer 213 outputs the active synchronization signals ACT1 to ACT16 and the blank synchronization signals BNK1 to BNK16 may be different in the first frame and the second frame. In one example, while the packet generator 215 receives the first frame from the image processing logic 214, the video timer 213 may output the active synchronization signals ACT1 to ACT16 and the blank synchronization signals BNK1 to BNK16 in a first sequence as illustrated in FIG. 13 to the packet generator 215. Additionally, while the packet generator 215 receives the second frame from the image processing logic 214, the video timer 213 may output the active synchronization signals ACT1 to ACT16 and the blank synchronization signals BNK1 to BNK16 to the packet generator 215 in a second sequence as illustrated in FIG. 16.

In this manner, in order to change the upscaling pattern during transmission of the display data including the original image and the synchronization signal and output of the result image, the configuration of the storage 212 may be changed. Hereinafter, some example embodiments will be described with reference to FIGS. 18 to 21.

FIGS. 18 to 21 are views illustrating an operation of an electronic device according to some example embodiments of the present disclosure.

Referring to FIGS. 18 to 21, an electronic device 500 according to an embodiment of the present disclosure may include a processor 510 and a display driving device 520, and the processor 510 and the display driving device 520 may exchange data with each other through a serial interface such as a MIPI interface. The processor 510 may include a core 511, a storage 512, a video timer 513, an image processing logic 514, a packet generator 515, a scaling information processing logic 516, and a system bus 517. Components 511 to 516 included in the processor 510 may exchange data with each other through the system bus 517.

The display driving device 520 may include an image scaler 521. In addition to the image scaler 521, the display driving device 520 may further include a timing controller, a gate driver, and a source driver, for driving the display panel. The image scaler 521 may receive the image data included in the original image from the processor 510, and may perform an upscaling operation of increasing the resolution of the image data, thereby generating the result image.

In some example embodiments described with reference to FIGS. 18 to 21, the storage 512 may include a first storage 518 and a second storage 519. By operating the first storage 518 and the second storage 519 separately, different upscaling patterns may be applied in units of frames included in the original image.

For example, the image scaler 521 may generate a first result frame by upscaling the first frame of the original image with a first upscaling pattern, and may generate a second result frame by upscaling a second frame after the first frame of the original image using a second upscaling pattern. The image scaler 521 may first transmit first scaling information including the first upscaling pattern to the processor 510, and the first scaling information may first be stored in the second storage 519 by the scaling information processing logic 516.

Figure 19:
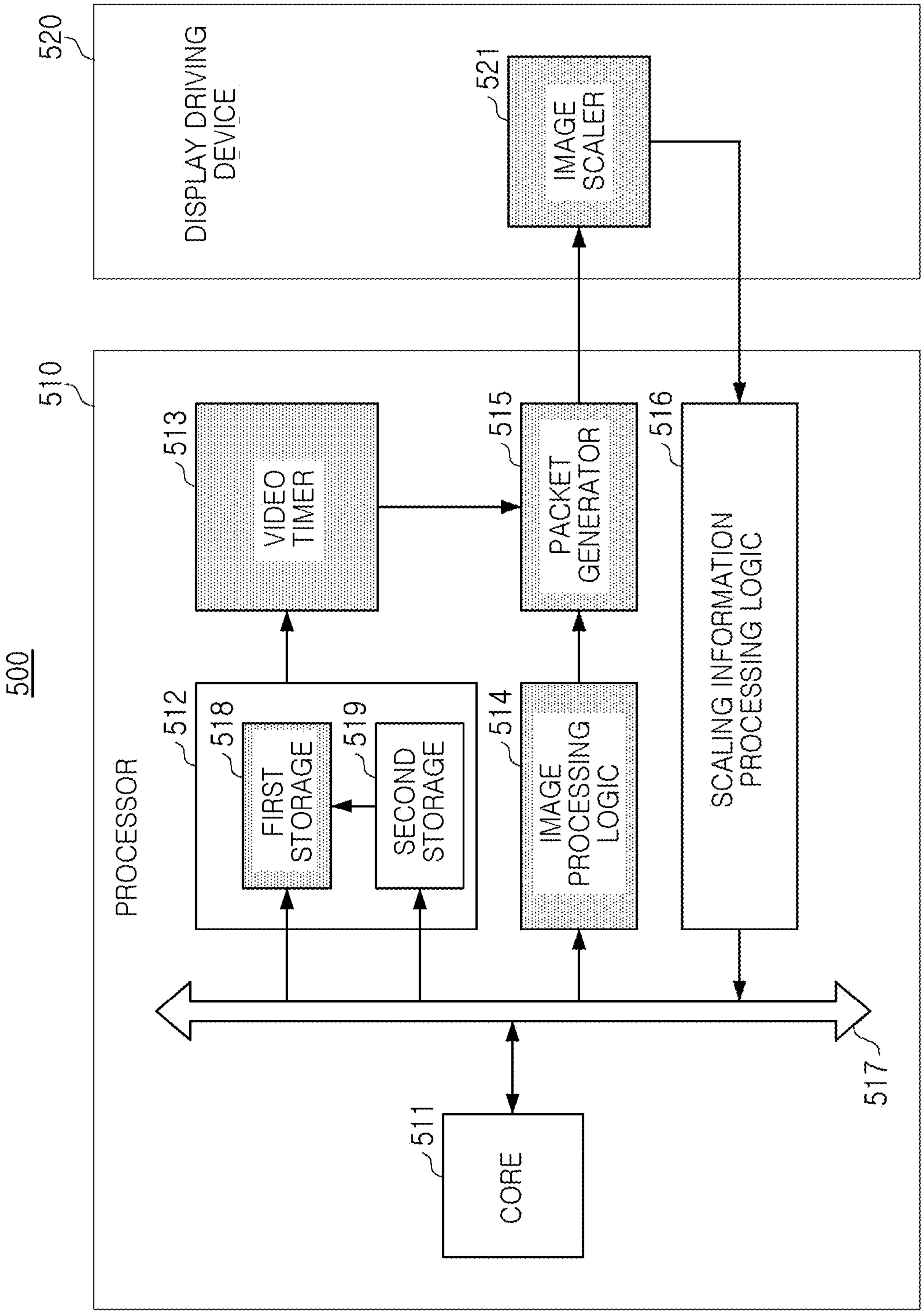

After the first scaling information is moved from the second storage 519 to the first storage 518, the first scaling information may be output from the first storage 518 to the video timer 513. Referring to FIG. 19, the video timer 513 may generate a vertical synchronization signal and a horizontal synchronization signal by referring to the first scaling information. Meanwhile, the packet generator 515 may synchronize the image data of the first frame received from the image processing logic 514 with the synchronization signal received from the video timer 513, and may transmit the image data to the image scaler 521.

When the second upscaling pattern intends to be applied to the second frame, the image scaler 521 may transmit second scaling information to the scaling information processing logic 516. In one example, the second scaling information may be transmitted to the scaling information processing logic 516 while the image scaler 521 generates a first result frame obtained by upscaling the first frame and outputs the first result frame to the display panel.

Figure 20:
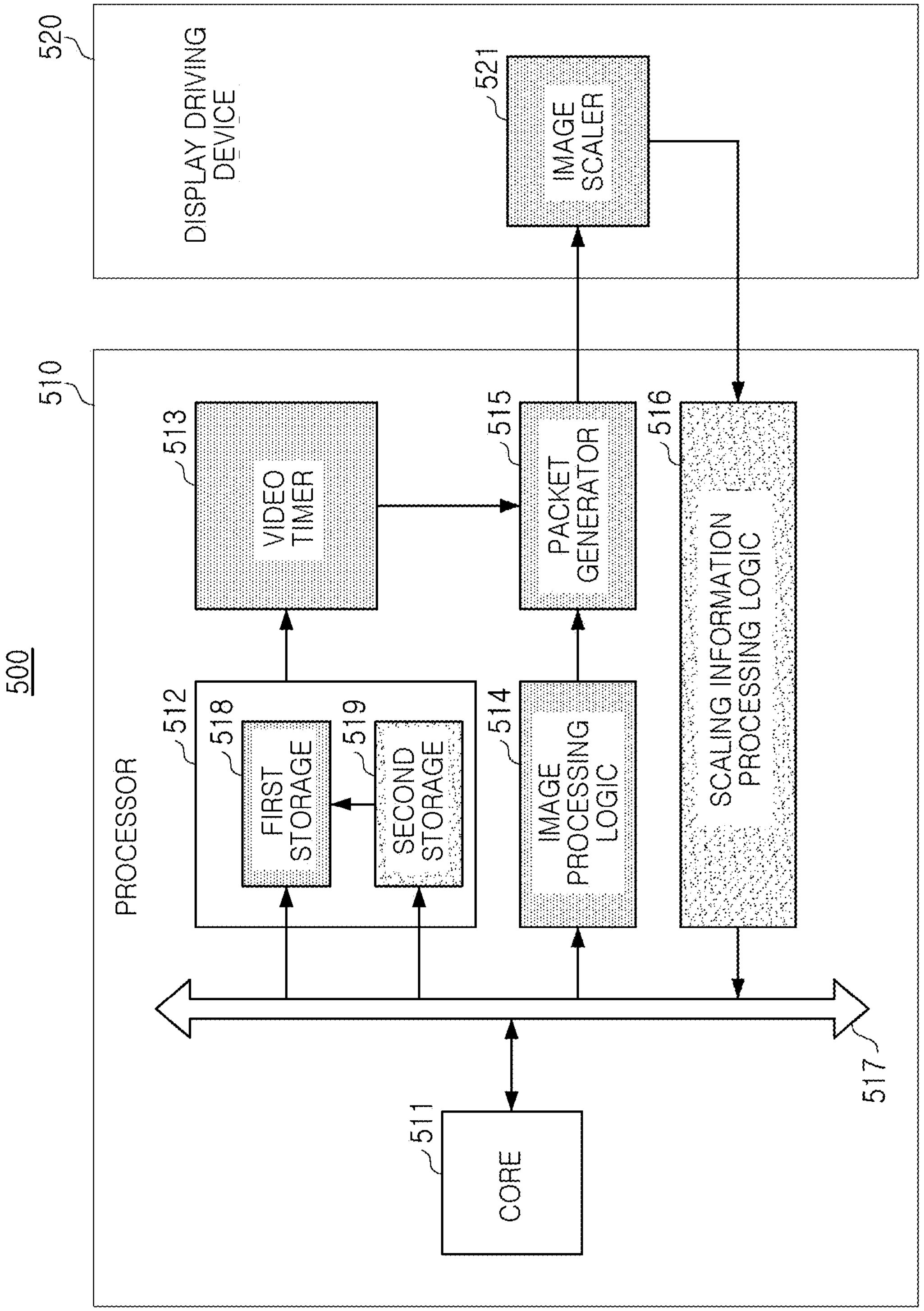
Figure 21:
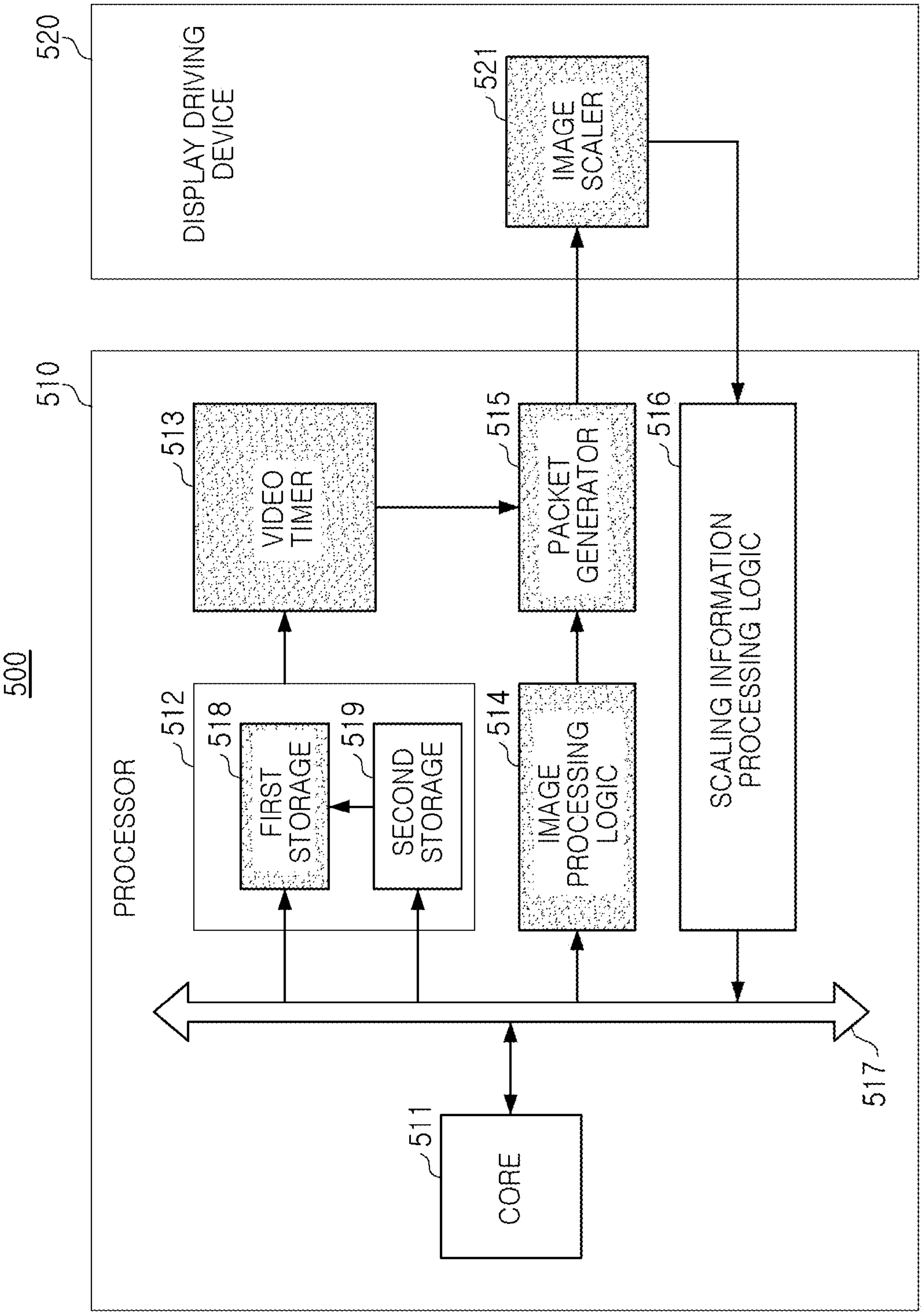

As illustrated in FIG. 20, the second scaling information may first be stored in the second storage 519, and the first scaling information may remain stored in the first storage 518. The scaling information processing logic 516 may transmit an update request to the first storage 518 through the system bus 517. The first storage 518 may receive and store the second scaling information from the second storage, as illustrated in FIG. 21 after the output of the vertical synchronization signal and the horizontal synchronization signal for the first frame is completed, and may generate the vertical synchronization signal and the horizontal synchronization signal by referring to the second scaling information.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

The present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

What is claimed is:

1. An electronic system comprising:

a processor configured to output a synchronization signal and image data corresponding to an original image having a first resolution; and a display driving circuit configured to, based on the image data and the synchronization signal, generate a result image being displayed on a display panel, the result image having a second resolution, higher than the first resolution, the image data including a plurality of line image data corresponding to horizontal lines of the original image, and the synchronization signal including a plurality of horizontal synchronization signals output at horizontal periods, the plurality of horizontal synchronization signals including a plurality of active synchronization signals determining output timing of the plurality of line image data, and a plurality of blank synchronization signals unrelated to the plurality of line image data, wherein a number of the plurality of blank synchronization signals is equal to a number of horizontal lines in the result image less a number of horizontal lines in the original image, and the processor configured to output at least one of the plurality of blank synchronization signals between at least some of the plurality of active synchronization signals, based on scaling information determined based on the first resolution and the second resolution, wherein the display driving circuit includes an image scaling circuit configured to generate the result image based on upscaling the original image, wherein the image scaling circuit is configured to determine an output timing of the plurality of blank synchronization signals and the number of the plurality of blank synchronization signals.

2. The electronic system of claim 1, wherein the synchronization signal further includes a vertical synchronization signal determining a frame period, and the number of horizontal lines in the original image is equal to a number of times at which the processor is configured to output active synchronization signals during one frame period.

3. The electronic system of claim 2, wherein the processor is configured to consecutively output two or more of the plurality of active synchronization signals when the vertical synchronization signal is output and the frame period begins.

4. The electronic system of claim 1, wherein the processor is configured to match and output the plurality of line image data to the plurality of active synchronization signals, respectively.

5. The electronic system of claim 4, wherein the processor is configured to determine a horizontal period in response to adjusting a porch section of an original horizontal period determined based on the first resolution, and the processor is configured to adjust the porch section based on the scaling information.

6. The electronic system of claim 5, wherein the processor is configured to adjust a length of at least one of a back porch section before an active section of the original horizontal period and a front porch section after the active section.

7. The electronic system of claim 1, wherein the processor includes:

a storage configured to store the scaling information;

a video timing circuit configured to generate control data including an output timing of the plurality of blank synchronization signals and a number of the plurality of blank synchronization signals based on the scaling information; and a packet generating circuit configured to output the plurality of active synchronization signals, the plurality of line image data, and the plurality of blank synchronization signals to the display driving circuit based on the control data.

8. A display driving device comprising:

a data receiving circuit configured to receive display data including image data and a synchronization signal from an external host; and an image scaling circuit configured to upscale resolution of the image data based on a plurality of horizontal synchronization signals included in the synchronization signal and transmitted at horizontal periods, the plurality of horizontal synchronization signals including a plurality of active synchronization signals transmitted in synchronization with a plurality of line image data corresponding to a plurality of horizontal lines included in the image data, and a plurality of blank synchronization signals unrelated to the plurality of line image data, wherein a number of the plurality of blank synchronization signals is equal to a number of horizontal lines of the upscaled resolution of the image data less a number of the plurality of horizontal lines included in the image data, and the image scaling circuit is configured to generate a plurality of additional line image data synchronized to the plurality of blank synchronization signals, based on at least one of the plurality of line image data transmitted in synchronization with at least one of the plurality of active synchronization signals.

9. The display driving device of claim 8, further comprising:

a gate driver configured to drive a plurality of pixels included in a display panel;

a source driver configured to determine data signal based on the plurality of line image data and the plurality of additional line image data, and to output the data signal to the plurality of pixels; and a timing controller configured to control operation timing of the gate driver and the source driver based on the plurality of horizontal synchronization signals.

10. The display driving device of claim 9, wherein the source driver is configured to output the data signal during an active section included in a horizontal period of each of the plurality of horizontal synchronization signals, the horizontal period further including a back porch section before the active section, and a front porch section after the active section, and a length of the front porch section is different from a length of the back porch section.

11. The display driving device of claim 10, wherein the length of the front porch section is longer than the length of the back porch section.

12. The display driving device of claim 10, wherein the image scaling circuit is configured to generate pixel data output to the display panel based on the source driver, during at least a portion of the front porch section of each of the plurality of active synchronization signals.

13. The display driving device of claim 12, wherein the timing controller is configured to control the gate driver and the source driver based on a front porch section of an internal horizontal synchronization signal, the front porch section of each of the plurality of active synchronization signals being longer than the front porch section of the internal horizontal synchronization signal.

14. The display driving device of claim 8, wherein the image data has first resolution, and a result image output to a display panel has second resolution, higher than the first resolution.

15. A processor comprising:

a storage configured to store scaling information received externally, wherein the scaling information includes a number of horizontal lines in a result image;

a video timing circuit configured to generate a vertical synchronization signal and a horizontal synchronization signal based on the scaling information;

a packet generating circuit configured to generate a plurality of data packets within one period of the vertical synchronization signal; and an image processing circuit configured to output an original image including a plurality of line image data arranged along a plurality of horizontal lines to the packet generating circuit wherein the packet generating circuit is configured to generate a portion of the plurality of data packets based on matching active synchronization signals included in the horizontal synchronization signal with the plurality of line image data, respectively, and generate a remainder of the plurality of data packets using blank synchronization signals included in the horizontal synchronization signal, wherein a number of the blank synchronization signals is equal to the number of the horizontal lines in the result image less a number of the plurality of horizontal lines in the original image.

16. The processor of claim 15, wherein the video timing circuit is configured to generate the vertical synchronization signal and the horizontal synchronization signal based on first scaling information while the image processing circuit outputs a first frame of the original image, and the video timing circuit is configured to generate the vertical synchronization signal and the horizontal synchronization signal based on second scaling information different from the first scaling information while the image processing circuit outputs a second frame following the first frame of the original image.

17. The processor of claim 16, wherein the storage includes first storage and second storage, and wherein the first storage is configured to store the first scaling information and the second storage is configured to store the second scaling information while the image processing circuit outputs the first frame.

18. The processor of claim 16, wherein the video timing circuit is configured to output the active synchronization signals and the blank synchronization signals according to a first sequence while the packet generating circuit receives the first frame from the image processing circuit, and the video timing circuit is configured to output the active synchronization signals and the blank synchronization signals according to a second sequence different from the first sequence while the packet generating circuit receives the second frame from the image processing circuit.

19. The processor of claim 18, wherein a number of times at which the blank synchronization signals are output according to the first sequence is equal to a number of times at which the blank synchronization signals are output according to the second sequence.

* * * * *